(12) United States Patent
Chow et al.

(10) Patent No.: US 7,697,619 B2
(45) Date of Patent: Apr. 13, 2010

(54) TRAINING SEQUENCE FOR CHANNEL ESTIMATION IN A DATA TRANSMISSION SYSTEM

(75) Inventors: Jacky S. Chow, Mountain View, CA (US); Pak Hei Matthew Leung, Hong Kong (CN); King-Fuk Luk, Hong Kong (CN); Slobodan Nedic, Somerset, NJ (US); Eugene Yuk-Yin Tang, Richmond Hill (CA)

(73) Assignee: Marvell World Trade Ltd., St. Michael (BB)

( * ) Notice: Subject to any disclaimer, the term of this patent is extended or adjusted under 35 U.S.C. 154(b) by 1058 days.

(21) Appl. No.: 10/865,133

(22) Filed: Jun. 9, 2004

(65) Prior Publication Data
US 2005/0276338 A1 Dec. 15, 2005

(51) Int. Cl.
*H04L 27/28* (2006.01)
(52) U.S. Cl. .................................. 375/260; 375/340
(58) Field of Classification Search ............... 375/260, 375/340; 370/210, 480; 379/93.01
See application file for complete search history.

(56) References Cited

U.S. PATENT DOCUMENTS

| | | | |
|---|---|---|---|
| 4,238,746 A | 12/1980 | McCool et al. | |
| 4,791,390 A | 12/1988 | Harris et al. | |
| 4,811,342 A * | 3/1989 | Huang | 370/292 |
| 5,440,347 A | 8/1995 | Guan | |
| 5,519,730 A | 5/1996 | Jasper et al. | |
| 5,732,113 A | 3/1998 | Schmidl et al. | |
| 5,809,086 A | 9/1998 | Ariyavisitakul | |
| 5,901,180 A | 5/1999 | Aslanis et al. | |
| 5,995,568 A | 11/1999 | Molnar et al. | |
| 6,021,167 A | 2/2000 | Wu | |
| 6,134,283 A | 10/2000 | Sands et al. | |
| 6,279,022 B1 | 8/2001 | Miao et al. | |
| 6,434,119 B1 | 8/2002 | Wiese et al. | |
| 6,584,164 B1 | 6/2003 | Tuukkanen | |
| 6,735,244 B1 | 5/2004 | Hasegawa et al. | |
| 6,888,886 B2 * | 5/2005 | Ito | 375/225 |
| 6,928,110 B2 | 8/2005 | Ougi et al. | |
| 6,944,244 B2 | 9/2005 | Belotserkovsky et al. | |
| 6,954,421 B2 | 10/2005 | Kuwabara et al. | |

(Continued)

FOREIGN PATENT DOCUMENTS

EP 0 969 608 A2 1/2000

(Continued)

OTHER PUBLICATIONS

Nenad Popovic et al. Per-Bin DFE for Advanced OQAM-based Multi-Carrier Wireless Data Transmission Systems IEEE 2002.*

(Continued)

*Primary Examiner*—David C Payne
*Assistant Examiner*—Leon Flores

(57) ABSTRACT

An improved training sequence for estimating a channel (e.g., channel impulse response) in the time domain is disclosed. The improved training sequence enables time-domain estimation and eliminates the need for correct frequency-domain channel estimation at every frequency. By utilizing the training sequence according to the invention, estimation of each of a plurality of time-domain channel taps can be decoupled from each other. This enables a channel estimate to be performed with not only a higher convergence speed but also lower complexity.

53 Claims, 20 Drawing Sheets

U.S. PATENT DOCUMENTS

| | | | |
|---|---|---|---|
| 6,985,548 | B1 | 1/2006 | Jabbar et al. |
| 6,999,517 | B1 | 2/2006 | Bombay et al. |
| 7,016,429 | B1 * | 3/2006 | Dogan et al. ............... 375/279 |
| 7,088,782 | B2 | 8/2006 | Mody et al. |
| 7,254,196 | B2 | 8/2007 | Kriedte et al. |
| 7,426,232 | B2 | 9/2008 | Matsuoka et al. |
| 7,436,881 | B2 * | 10/2008 | Nedic et al. ................. 375/233 |
| 7,453,794 | B2 | 11/2008 | Fang et al. |
| 2002/0075797 | A1 | 6/2002 | Kilani |
| 2002/0126768 | A1 | 9/2002 | Isaksson et al. |
| 2004/0076246 | A1 | 4/2004 | Vanderperren et al. |
| 2004/0125862 | A1 | 7/2004 | Li et al. |
| 2004/0131011 | A1 | 7/2004 | Sandell et al. |
| 2005/0117672 | A1 | 6/2005 | Liang |
| 2005/0135432 | A1 | 6/2005 | Kelley et al. |
| 2005/0152314 | A1 | 7/2005 | Sun et al. |

FOREIGN PATENT DOCUMENTS

| | | |
|---|---|---|
| EP | 1 035 699 A2 | 9/2000 |
| EP | 1 313 283 A2 | 5/2003 |
| EP | 1 414 208 A1 | 4/2004 |
| WO | WO 2004/028055 A1 | 4/2004 |

OTHER PUBLICATIONS

Minn et al., "A Robust Timing and Frequency Synchronization for OFDM Systems," IEEE Transactions on Wireless Communications, vol. 2, No. 4, Jul. 2003.

Mochizuki et al., "A High Performance Frequency and Timing Synchronization Technique of OFDM," IEEE Globecom 1998, Piscataway, NJ, vol. 6, Nov. 8, 1998, pp. 3443-3448.

Platbrood et al., "Analysis of Coarse Frequency Synchronisation for Hiperlan Type-2," Vehicular Technology Conference, IEEE VTS 50$^{th}$, Amsterdam, Netherlands, Sep. 19-22, 1999, pp. 688-692.

International Search Report and Written Opinion dated Oct. 6, 2005 for corresponding PCT Application No. PCT/US2005/020075.

International Search Report and Written Opinion dated Sep. 26, 2005 for corresponding PCT Application No. PCT/US2005/019986.

International Search Report and Written Opinion dated Sep. 30, 2005 for corresponding PCT Application No. PCT/US2005/020073.

International Search Report and Written Opinion dated Oct. 6, 2005 for corresponding PCT Application No. PCT/US2005/020084.

J. S. Chow et al., "Equalizer Training Algorithms for Multicarrier Modulation Systems," 1993 International Conference on Communications, pp. 761-765, Geneva, May 1993.

J. S. Chow et al., "ADSL Standard and Recommended Training Sequence for Time Domain Equalizers (TQE) with DMT," ANSI T1E1.4 Committee Contribution No. 93-086, Apr. 15, 1993.

John M. Cioffi et al., "G.vdsl: Digital Duplexing: VDSL Performance Improvement by Aversion of Frequency Guard Bands," ITU Temporary Document NT-041, Nashville Tennessee, Nov. 1999.

L. Hanzo et al., "Single- and Multi-carrier Quadrature Amplitude Modulation," Chapter 21, Wiley, ISBN 0471492396, 2000.

Van Acker et al., "Per Tone Equalization for DMT-Based Systems," IEEE Transactions on Communications, vol. 49, No. 1, Jan. 2001.

Van Acker et al., "Per Tone Echo Cancellation for DMT-Based Systems," IEEE Transactions on Communications, vol. 51, No. 9, Sep. 2003.

Leus and Moonen, "Per-Tone Equalization for MIMO OFDM Systems," IEEE Transactions on Signal Processing, vol. 51, No. 11, Nov. 2003.

* cited by examiner

TRAINING SEQUENCE FOR CHANNEL ESTIMATION IN A DATA TRANSMISSION SYSTEM

CROSS-REFERENCE TO RELATED APPLICATIONS

This application is related to: (i) U.S. patent application Ser. No. 10/865,256, filed Jun. 9, 2004, entitled "TRAINING SEQUENCE FOR SYMBOL BOUNDARY DETECTION IN A MULTICARRIER DATA TRANSMISSION SYSTEM," and incorporated herein by reference; (ii) U.S. patent application Ser. No. 10/866,327, filed Jun. 9, 2004, entitled "METHOD AND SYSTEM FOR DETERMINING SYMBOL BOUNDARY TIMING IN A MULTICARRIER DATA TRANSMISSION SYSTEM," and incorporated herein by reference; and (iii) U.S. patent application Ser. No. 10/865,093, filed Jun. 9, 2004, now U.S. Pat. No. 7,561,626, entitled "METHOD AND SYSTEM FOR CHANNEL ESTIMATION IN A DATA TRANSMISSION SYSTEM," and incorporated herein by reference.

BACKGROUND OF THE INVENTION

1. Field of the Invention

The present invention relates to data transmission systems and, more particularly, to multicarrier data transmission systems.

2. Description of the Related Art

A conventional voice-band modem can connect computer users end-to-end through the Public Switched Telephone Network (PSTN). However, the transmission throughput of a voice-band modem is limited to below 40 Kbps due to the 3.5 KHz bandwidth enforced by bandpass filters and codes at the PSTN interface points. On the other hand, the twisted-pair telephone subscriber loop of a computer user has a much wider usable bandwidth. Depending on the length of the subscriber loop, the bandwidth at a loss of 50 dB can be as wide as 1 MHz. Transmission systems based on local subscriber loops are generally called Digital Subscriber Lines (DSL).

One DSL technique for high-speed data communications is Asymmetrical Digital Subscriber Line (ADSL) signaling for the telephone loop which has been defined by standards as a communication system specification that provides a low-rate data stream from the residence to the telephone company's central office (upstream), and a high-rate data stream from the central office to the residence (downstream). The ADSL standard provides for operation without affecting conventional voice telephone communications, e.g., Plain Old Telephone Service (POTS). The ADSL upstream channel only provides simple control functions or low-rate data transfers. The high-rate downstream channel provides a much higher throughput. This asymmetrical information flow is desirable for applications such as video-on-demand (VOD).

An ADSL modem operates in a frequency range that is higher than the voice-band; this permits higher data rates. However, the twisted-pair subscriber line has distortion and losses which increase with frequency and line length. Thus, the ADSL standard data rate is determined by a maximum achievable rate for a length of subscriber lines. The ADSL standard uses Discrete Multi-Tone (DMT) modulation with the DMT spectrum divided into two-hundred fifty-six 4.3125 kHz carrier bands and a quadrature amplitude modulation (QAM) type of constellation is used to load a variable number of bits onto each carrier band independently of the other carrier bands.

Besides ADSL, another DSL technique for high-speed data communications over twisted-pair phone lines is known as Very High Speed Digital Subscriber Lines (VDSL). VDSL is intended to facilitate transmission rates greater than that offered by ADSL. The multicarrier transmission schemes used with VDSL can be Discrete Multi-Tone (DMT) modulation, or some other modulation scheme such as Discrete Wavelet Multi-Tone (DWMT) modulation, Quadrature Amplitude Modulation (QAM), Carrierless Amplitude and Phase modulation (CAP), Quadrature Phase Shift Keying (QPSK), or vestigial sideband modulation.

Digital communication systems transmit data from a transmitter over a channel to a receiver. In order to support reliable, high performance operation, digital communication systems often need to estimate the impulse response of the channel. The channel can represent a channel from the transmitter to a far-end receiver or from the transmitter to a near-end receiver. The digital communication system can utilize the estimated channel impulse response for far-end or near-end noise cancellation schemes and far-end channel equalization.

Prior approaches to estimating a channel impulse response have been implemented in either the time domain or the frequency domain. In the case of time-domain channel estimation techniques, the estimated channel is convolved with the transmitted signal in an adaptive manner. However, such a solution produces only a single error signal that is used to update all taps of a finite impulse response filter that provides the estimated channel. This approach is complex and slow to converge.

FIG. 1 is a block diagram of a conventional time-domain channel taps estimation apparatus 100. In such scheme, each error signal (err_sig) contains the effect due to incorrect estimation of all M taps of the channel being estimated. The error signal is used to update the M taps for use by a Finite Impulse Response (FIR) filter which produces the channel estimate. Consequently, updates to the channel estimate based on each error signal require changes to all M taps. The error signal is therefore a poor metric for updating the estimated taps based on Least Means Square (LMS) algorithm. As a result, this training method often results in slow convergence. Although a Recursive Least Squares (RLS) algorithm helps decouple the error signal, such an approach often translates to increased hardware complexity. Moreover, to generate the response based on the estimated channel for calculating the error signal, the transmit signal needs to be convolved with the estimated channel. Each of the estimated output samples thus requires M multiplications between the M taps for the estimated channel and M samples of the input signals. This requires considerable processing time and computation power.

Frequency-domain channel identification approaches are more common. One approach requires transforming time-domain signals to frequency-domain tones, training frequency-domain taps for a FIR filter that provides the estimated channel, and then finally converting the frequency-domain taps back to the time-domain channel estimate. This approach allows each tap to be independently trained and adapted in the frequency domain. However, the disadvantages of this frequency-domain approach are that additional hardware for fast Fourier transforms and inverse fast Fourier transforms are required on the receiver side, and that the training signals utilized must span the entire frequency bandwidth. Unfortunately, in some implementations of digital communication systems, there are restrictions on usage of certain frequencies for the purpose of training and thus the entire frequency bandwidth is sometimes not permitted to be used.

FIG. 2 is a block diagram of a conventional frequency-domain channel taps estimation apparatus 200. The required time-domain taps are derived from the IFFT transformation of an estimated frequency-domain response. The frequency-domain response is estimated through an independent adaptive update for each of the frequency taps. With the frequency-domain based approach to estimate the time-domain taps, the training algorithm requires a correct frequency response estimation at every frequency index. Failure to estimate certain frequency-domain taps correctly would result in a poor time-domain response estimate. Since the frequency responses are correctly estimated only if a training signal at that frequency is excited, this requirement is a problem for a lot of standard frequency plans, e.g., ADSL or VDSL. In these frequency plans, the training signals are not allowed to transmit over the full spectrum. To deal with the problem, one approach uses extrapolation or interpolation of the correct frequency taps to the taps that could not be trained. However, extrapolation or interpolation fails to give reasonable performance, especially when a wide frequency band is not available for training, leading to a smaller number of correctly estimated taps.

Another approach to estimating the channel response in the frequency domain can utilize a frequency-domain adaptive comb filter. In K. Van Acker, M. Moonen, T. Pollet, "Per-Tone Echo Cancellation for DMT-based system," IEEE Transactions on Communications, Vol. 51, No. 9 (September 2003), a per tone echo cancellation structure enables the transformation of time-domain taps to the frequency-domain adaptive comb filter taps. The frequency-domain adaptive comb filter taps can be directly trained to estimate the desired taps. The update of the adaptive comb filter taps for each of the frequency tones is unfortunately based on a single error signal, similar to the conventional time-domain channel taps estimation. As a result, this approach shares the same disadvantages of the conventional time-domain channel taps estimation, namely, high computational complexities and slow convergence.

Thus, there remains a need for improved approaches to estimating channel response in a digital communication system.

SUMMARY OF THE INVENTION

The invention pertains to an improved training sequence for estimating a channel (e.g., channel impulse response) in the time domain. The improved training sequence enables time-domain estimation and eliminates the need for correct frequency-domain channel estimation at every frequency. By utilizing the training sequence according to the invention, estimation of each of a plurality of time-domain channel taps can be decoupled from each other. This enables a channel estimate to be performed with not only a higher convergence speed but also lower complexity.

One aspect of the invention pertains to improved techniques to estimate a time-domain channel using a training sequence that includes sets of subparts of the training sequence, each of the subparts includes samples that are at least primarily pseudo-random, and, within each of the sets of subparts, the samples are the same except for a single corresponding pair of samples within the subparts. Otherwise, the subparts are identical.

Another aspect of the invention is channel estimation at a receiver wherein operation is rapid and hardware requirements are not overly burdensome. The channel estimation uses time-domain signals to produce a time-domain channel estimate. Optionally, the channel estimation can further use frequency-domain signals to provide a frequency-domain channel estimate, independent from or jointly with partial time-domain estimation.

The channel being estimated can be a direct channel impulse response, an echo channel impulse response or a crosstalk channel impulse response. The crosstalk channel impulse response would be associated with a digital multiple-input/multiple-output communication system.

The various aspects of the invention can be applied to different data transmission systems, including standard single carrier or multicarrier modulation systems. In this method, it is assumed that the data transmission systems have full control on the training signals transmitted for channel estimation.

Different embodiments of the invention can incorporate one or more of these aspects.

The invention can be implemented in numerous ways, including as a method, system, device, apparatus, or computer readable medium. Several embodiments of the invention are discussed below.

In one embodiment of the invention, a training sequence is utilized to produce a channel estimate at a receiver of a data transmission system. The series of blocks of training samples of the training sequence are transmitted over a wire to the receiver. For a given pair of the blocks of training samples, all samples in the given pair of the blocks of training samples are identical except for one particular sample that is different.

In another embodiment of the invention, training sequence is utilized to produce a channel estimate at a receiver of a data transmission system. The series of blocks of training samples of the training sequence are transmitted over a wire to the receiver. For a given group of the training samples, all the training samples in the given group are periodic with a periodicity of T, except for one of the training samples within the given group, where T is greater than or equal to the number of taps of the channel estimate.

As a method for transmitting a training sequence for use in a multicarrier data transmission system to produce a channel estimate, one embodiment of the invention includes at least the acts of: obtaining a training sequence, the training sequence including a plurality of blocks of samples; selecting a first block of the blocks of samples from the training sequence; transmitting the first block; modifying the first block such that only one of the samples of the samples within the first block is changed; transmitting the modified first block; selecting a second block of the blocks of samples from the training sequence; transmitting the second block; modifying the second block such that the sample at the same location in the second block as the modified one in the first block is changed; and transmitting the modified second block.

As a method for transmitting a training sequence for use in a multicarrier data transmission system to produce a channel estimate, another embodiment of the invention includes at least the acts of: obtaining a training sequence, the training sequence including a plurality of blocks of samples; selecting a first block of the blocks of samples from the training sequence; transmitting the first block; modifying the first block such that only one of the samples of the samples within the first block is changed; saving the modified first block into a buffer; selecting either a new block of the blocks of samples from the training sequence if not all of the training sequence has been transmitted, or a block of the blocks of samples from the buffer that stores modified blocks if that buffer is not empty; transmitting the selected block; if the selected block is a new block of the blocks of samples from the training sequence, modifying the selected block such that the sample at the same location as in the modified first block is changed;

and saving the modified selected block following said modifying when the selected block is a new block.

As a method for transmitting a training sequence for use in a multicarrier data transmission system to produce a channel estimate, another embodiment of the invention includes at least the acts of: obtaining a group of samples from a training sequence, the group of samples being periodic with a period of T, except for one sample, the number of samples in the group being at least 3T; and transmitting the group of samples.

As a computer readable medium including at least computer program code for transmitting a training sequence for use in a data transmission system to produce a channel estimate, one embodiment of the invention includes at least: computer program code for obtaining a training sequence, the training sequence including a plurality of blocks of samples; computer program code for selecting a first block of the blocks of samples from the training sequence; computer program code for transmitting the first block; computer program code for modifying the first block such that only one of the samples of the samples within the first block is changed; computer program code for transmitting the modified first block; computer program code for selecting a second block of the blocks of samples from the training sequence; computer program code for transmitting the second block; computer program code for modifying the second block such that the sample at the same location in the second block as the modified one of the samples within the first block is changed; and computer program code for transmitting the modified second block.

As a computer readable medium including at least computer program code for transmitting a training sequence for use in a data transmission system to produce a channel estimate, another embodiment of the invention includes at least: computer program code for obtaining a group of samples from a training sequence, the group of samples being periodic with a period of T, except for one sample, the number of samples in the group being at least 3T; and computer program code for transmitting the group of samples.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

Figure 1:
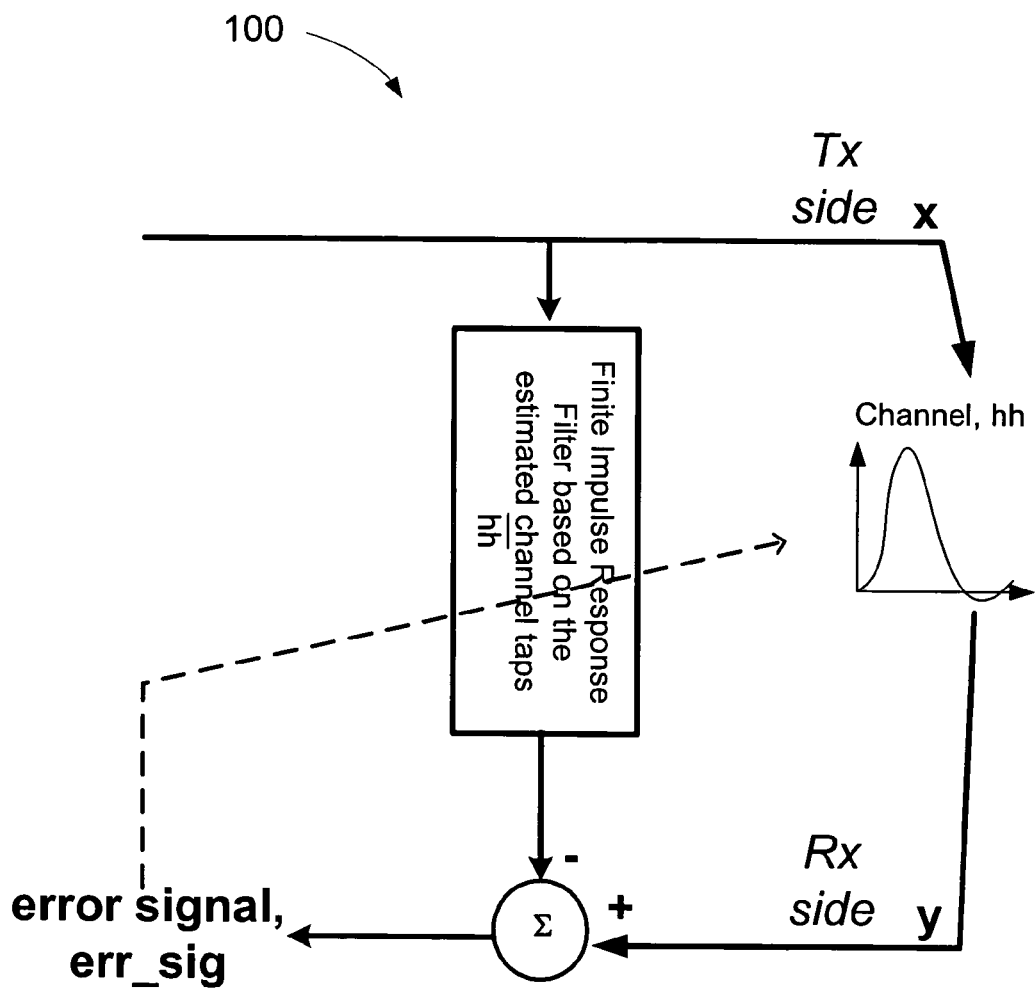
FIG. 1 is a block diagram of a conventional time-domain channel taps estimation apparatus.
Figure 2:
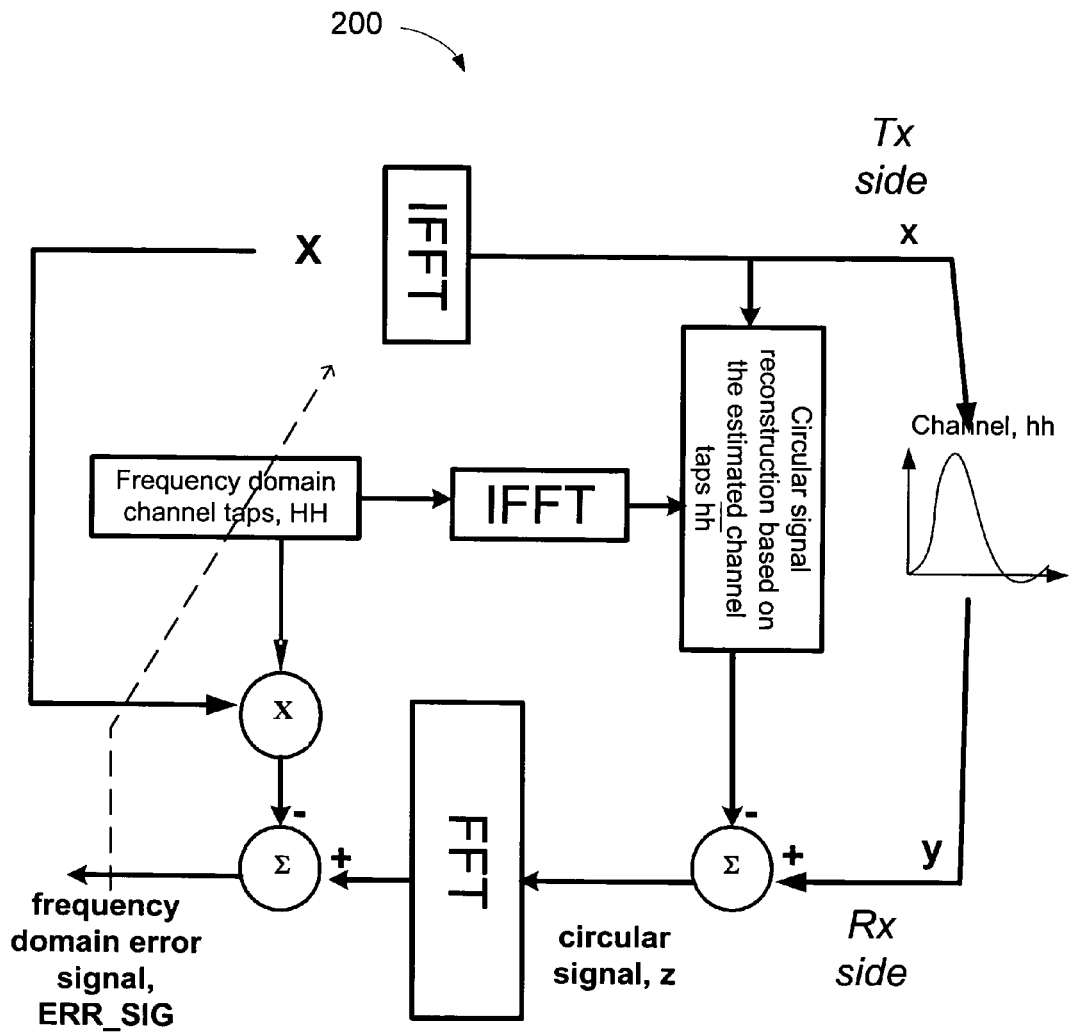
FIG. 2 is a block diagram of a conventional frequency-domain channel taps estimation apparatus.

The invention pertains to an improved training sequence for estimating a channel (e.g., channel impulse response) in the time domain. The improved training sequence enables time-domain estimation and eliminates the need for correct frequency-domain channel estimation at every frequency. By utilizing the training sequence according to the invention, estimation of each of a plurality of time-domain channel taps can be decoupled from each other. This enables a channel estimate to be performed with not only a higher convergence speed but also lower complexity.

One aspect of the invention pertains to improved techniques to estimate a time-domain channel using a training sequence that includes sets of subparts of the training sequence, each of the subparts includes samples that are at least primarily pseudo-random, and, within each of the sets of subparts, the samples are the same except for a single corresponding pair of samples within the subparts. Otherwise, the subparts are identical.

In one embodiment, the training sequence can be divided into pairs of packets. The pairs of packets can, but need not, be sequentially transmitted. For a given pair, the two packets of the particular training sequence are identical except for one sample. In one embodiment, the position of this one sample within the packet should be after the (M−1)th sample of the packet and before the (N−M+1)th sample of the packet, where M is the number of samples in the impulse response estimate, and N is the number of samples in a packet. Additionally, in such an embodiment, the packet should be at least 2M samples long. The pairs of packets of the training sequence can be supplied to a transmitter in a time-domain or a frequency-domain manner. A receiver makes use of the received signals over a channel between the transmitter and the receiver to determine the channel estimate.

Another aspect of the invention is channel estimation at a receiver wherein operation is rapid and hardware requirements are not overly burdensome. The channel estimation uses time-domain signals to produce a time-domain channel estimate. Optionally, the channel estimation can further use frequency-domain signals to provide a frequency-domain channel estimate.

The channel being estimated can be a direct channel impulse response, an echo channel impulse response or a crosstalk channel impulse response. The crosstalk channel impulse response would be associated with a digital multiple-input/multiple-output communication system.

The various aspects of the invention can be applied to different digital communication systems, including standard single carrier or multicarrier modulation systems. In this method, it is assumed that the digital communication systems have full control on the training signals transmitted for channel estimation.

Different embodiments of the invention can incorporate one or more of these aspects.

Embodiments of various aspects of the invention are discussed below with reference to FIGS. 3-13D. However, those skilled in the art will readily appreciate that the detailed description given herein with respect to these figures is for explanatory purposes as the invention extends beyond these limited embodiments.

The invention pertains to estimating a channel impulse response. Knowledge of the channel impulse response is useful in digital communication systems for various purposes, including channel shortening or noise cancellation schemes. One common noise cancellation scheme is echo cancellation.

In linear digital communication systems, a channel output is given by linearly convolving the channel input with the time domain channel taps. Assuming transmit signal samples are divided into series of N samples, the received series of samples, $z_i$, corresponding to the $i^{th}$ series of transmitted signal can be denoted as:

$$z_i = x_i \circledast hh \quad \text{Equation 1}$$

To facilitate later discussions, $z_i$, can also be expressed as:

$$z_i = y_i + cir\_noise_i \quad \text{Equation 2}$$

where $y_i = x_i \circledast hh$, and where hh is the time-domain channel response; $x_i$ is the $i^{th}$ series of time-domain transmit samples; $z_i$ is the $i^{th}$ series of time-domain receive samples; $y_i$ is the $i^{th}$ series of time-domain receive samples, if the transmit sequence is periodic over the length of $x_i$, i.e., cir_noise$_i$=0; cir_noise$_i$ is the $i^{th}$ series of time-domain circular noise samples; * denotes circular convolution; and $\circledast$ denotes linear convolution.

In many techniques used in channel identification, the estimated channel can be updated by an error signal (err). This error signal is obtained by calculating the difference between the estimated channel response (est_resp) and the actual channel response:

$$err = x <oper> hh - est\_resp \quad \text{Equation 3}$$

where est_resp is the estimated response vector and is most often given by the following equation:

$$est\_resp = x <oper> \overline{hh} \quad \text{Equation 4}$$

where hh is the actual channel vector; $\overline{hh}$ is the estimated channel vector; x is the input sequence vector; and <oper> denotes any operator depending on the system characteristics.

In the case of a time-domain channel, as denoted in Equation 1, the <oper> denoted in Equation 3 can be replaced by the linear convolution operator, $\circledast$. In such case, each of the samples of the estimated and actual channel response is affected by multiple samples from the input sequence and the channel vector. As a result, each of the samples of the error signal vector, err, also corresponds to the misadjustment of multiple samples of the estimated channel vector. Thus, there are substantial difficulties with decoupling such error signal to correspond to just one of the estimated channel taps $\overline{hh}$. As a result, identification of channel impulse response in the time domain is often deemed problematic, especially when M is large.

Although the determination of the actual channel response conventionally involves a complex convolution operation, the present invention allows simplification of the convolution operation to a multiplication and addition operation. The present invention allows a particular sample of error signal, err, to be dependent only on the misadjustment of a particular estimated tap of $\overline{hh}$. As a result, the update of each of the $\overline{hh}$ taps can be decoupled from one another. Consequently, the invention facilitates independent and individual estimation of channel taps which not only simplifies the architecture but also increases the convergence rate.

In one embodiment, the particular training sequence divides training signals into groups of two series, which can either be consecutive or non-consecutive. The groups should be random and be independent of each other. If the spread of the estimated channel response is M taps, each of the N sample long series should be larger or equal to 2M samples, (i.e. N≧2M). Hence, the total length of a group is at least 2N=2(2M)=4M. The two series should be identical except for one sample. This differing sample should be located after the $(M-1)^{th}$ and before the (N−M+1)th sample of the series. If we denote the index of such sample to be id, then, $$(M-1) < id < (N-M+1) \quad \text{Equation 5}$$

For convenience, the two series are denoted as $x_1$ and $x_2$. The two series are also both assumed to be based on a random sequence x:

$$x_1(1 \ldots N) = [x(1 \ldots (M-1)) \ldots p \ldots x((M+1) \ldots N)]$$

$$x_2(1 \ldots N) = [x(1 \ldots (M-1)) \ldots q \ldots x((M+1) \ldots N)] \quad \text{Equation 6}$$

where p and q can be any arbitrary number for p≠q.

Figure 3:
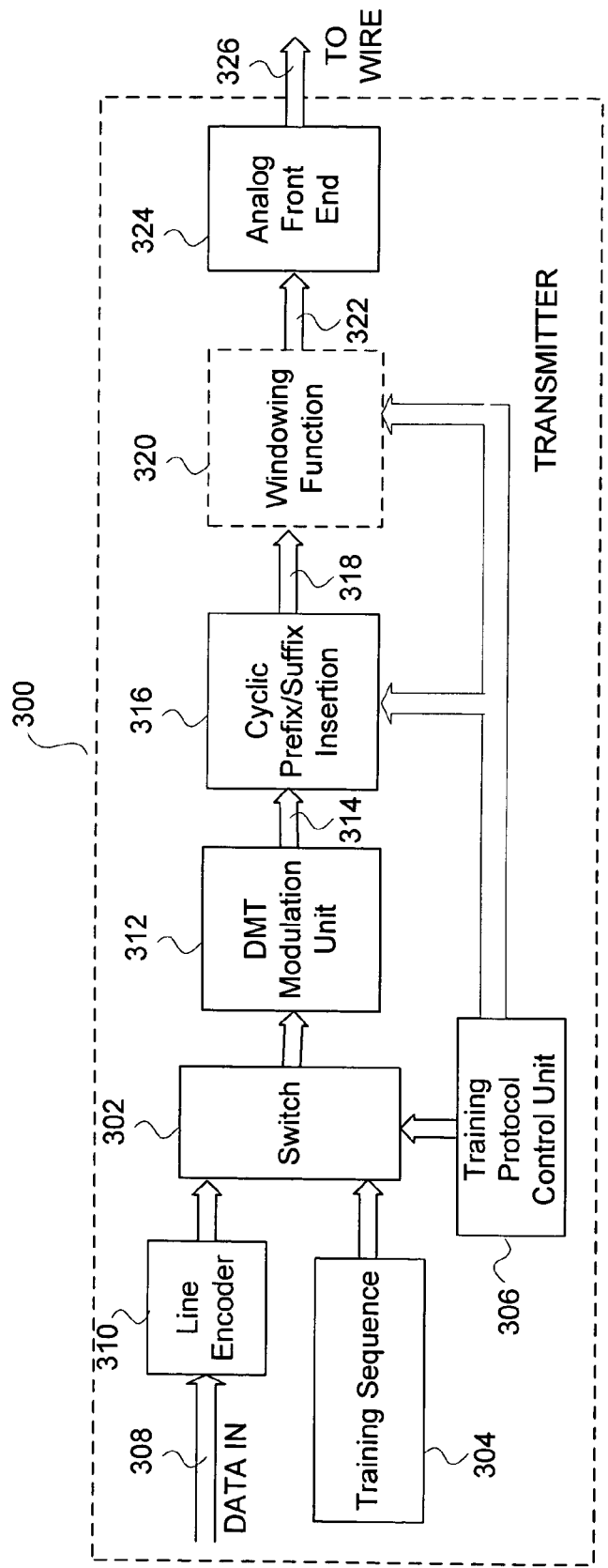
FIG. 3 is a block diagram of a transmitter according to one embodiment of the invention.

FIG. 3 is a block diagram of a transmitter 300 according to one embodiment of the invention. The transmitter 300 is, for example, associated with a multicarrier data transmission system.

The transmitter 300 includes a switch 302. The switch 302 can provide one data path in a data transmission mode and another data path in a training mode. When the switch 302 is set to the training mode, a training sequence 304 is supplied to the switch 302. In addition, a training protocol control unit 306 can interact with the switch 302 so as to control the manner by which the training sequence 304 is transmitted.

On the other hand, when the switch 302 is in the data transmission mode, data 308 to be transmitted is supplied to a line encoder 310. The line encoder 310 encodes the data 308 into symbols which are then supplied to the switch 302. For example, the symbols can be Quadrature Amplitude Modulated (QAM) symbols. Similarly, the training sequence 304 being supplied to the switch can be encoded.

The switch 302 outputs the appropriate symbols, i.e., data transmission symbols or training symbols. The symbols output from the switch 302 are supplied to a Discrete Multi-Tone (DMT) modulation unit 312 that converts the symbols into DMT symbols 314. For example, the DMT modulation unit 312 can be an Inverse Fast Fourier Transform (IFFT) circuit. The DMT symbols 314 are supplied to a cyclic prefix/suffix insertion unit 316. The cyclic prefix/suffix insertion unit inserts a cyclic prefix and/or a cyclic suffix to the DMT symbols 314. The cyclic prefix and/or cyclic suffix is used to maintain the circularity of the DMT symbol by reducing inter-symbol interference. The output of the cyclic prefix/suffix insertion unit 316 are enhanced symbols 318. The transmitter 300 optionally includes a windowing function 320. The windowing function 320 can be imposed on the enhanced symbols 318 to produce modified symbols 322. The training protocol control unit 306 can either instruct the cyclic prefix/suffix insertion unit 316 or the windowing function 320 to modify a particular sample within the sequence. The windowing function 320 can further reduce interference by reducing the magnitude of sidelobes.

The modified symbols 322 are then supplied to an analog front end 324 which converts the modified symbols 322 from a digital form into an analog form and then outputs analog signals 326 to a wire where they are transmitted to one or more receivers. The analog front end, for example, includes one or more line drivers, filters and digital-to-analog converters. In this regard, the modified symbols are transmitted over a channel from the transmitter 300 to a receiver. The channel may reflect a near-end channel with respect to a receiver proximate to the transmitter 300 or a far-end channel with respect to a receiver remote from the transmitter 300.

Figure 4:
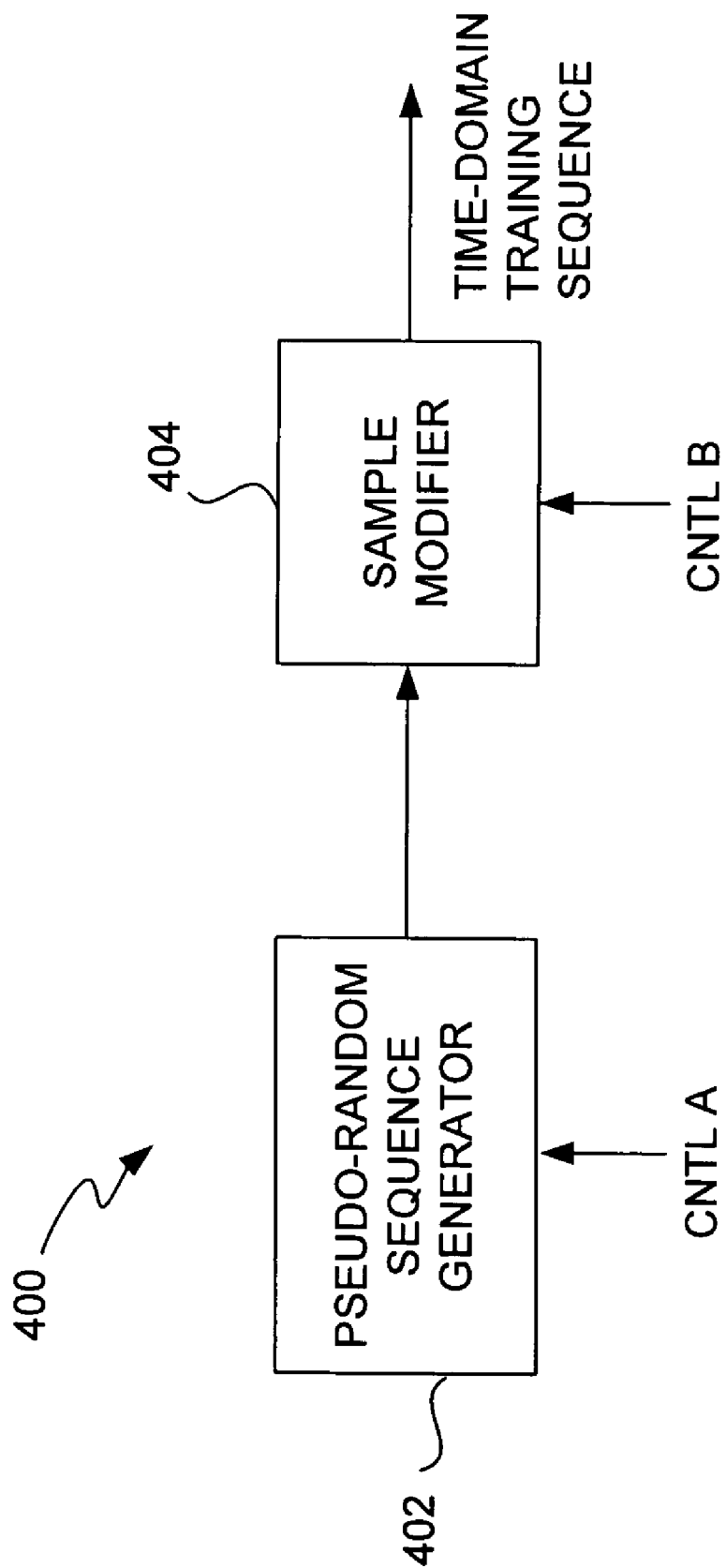
FIG. 4 is a block diagram of a training sequence generator according to one embodiment of the invention.

FIG. 4 is a block diagram of a training sequence generator 400 according to one embodiment of the invention. The training sequence generator 400 includes a pseudo-random sequence generator 402 and a sample modifier 404. The pseudo-random sequence generator 402 produces a random series of time-domain samples. A first control signal (CNTL-A) can be used to signal the pseudo-random sequence generator 402 to generate a new sample. The random series of time-domain samples are supplied to the sample modifier 404. Under the control of a second control signal (CNTL-B), the sample modifier 404 modifies one sample within a block of the time-domain samples. The output of the sample modifier 404 is the time-domain training sequence. As an example, the sample modifier 404 can periodically alter the single sample within each block of the generated samples.

In one embodiment, the sample being modified is within a central portion of the block. As an example, for a pair of blocks of samples such as described in Equation 6 above for the series $x_1$ and $x_2$, the series $x_1$ and $x_2$ are identical other than the samples p and q. The sample modifier 404 can cause the modification of the p sample to be different than the q sample or alternatively modifies the q sample to be different than the p sample. In other words, the pseudo-random sequence generated can include pairs of blocks of samples, with the first block having the series $x_1$ and not making use of sample modification, and with the second block having the series $x_2$ which is obtained from the series $x_1$ except that the sample modifier 404 operates to modify the p sample to be the q sample.

Figure 5:
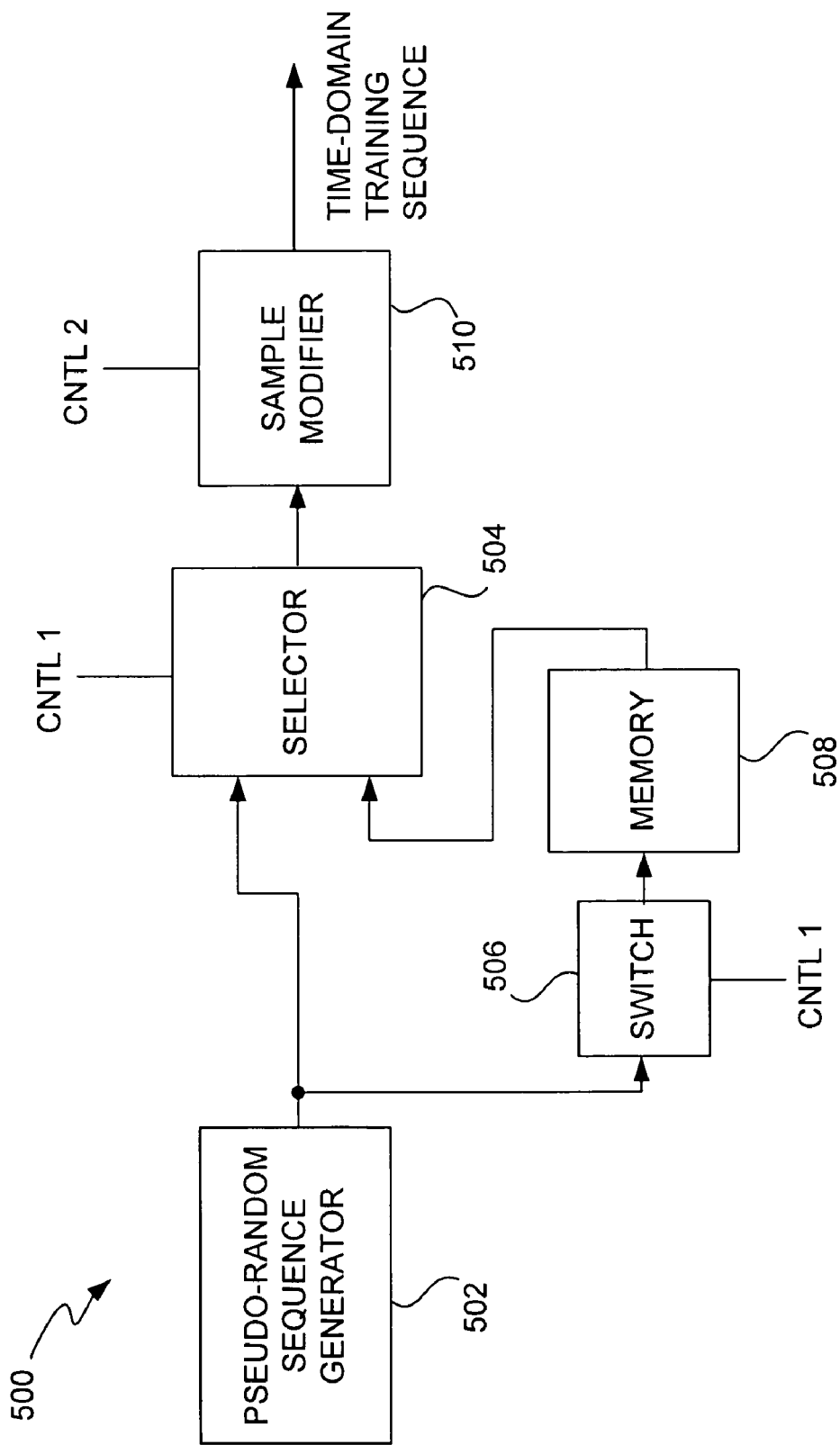
FIG. 5 is a block diagram of a training sequence generator according to another embodiment of the invention.

FIG. 5 is a block diagram of a training sequence generator 500 according to another embodiment of the invention. The training sequence generator 500 is, for example, a detailed embodiment of the training sequence generator 400 illustrated in FIG. 4.

The training sequence generator 500 includes a pseudo-random sequence generator 502 that produces a pseudo-random sequence of time-domain samples. The time-domain samples are supplied to a selector 504 and to a switch 506. The selector 504 and the switch 506 operate under the control of a first control signal (CNTL1). In a first mode, the pseudo-random sequence of time-domain samples is directed by the switch 506 to a memory 508. Also, in the first mode, the selector 504 passes the pseudo-random sequence of time-domain samples to a sample modifier 510. The sample modifier 510 operates under the control of a second control signal (CNTL2). In the first mode, the second control signal (CNTL2) does not activate the sample modifier 510; hence, the output of the sample modifier 510 is the pseudo-random sequence of time-domain samples as produced by the pseudo-random sequence generator 502 and which therefore represents a portion of the time-domain training sequence. On the other hand, in the second mode, the pseudo-random sequence of time-domain samples stored in the memory 508 are supplied to the selector 504 which passes the samples to the sample modifier 510. In the second mode, the second control signal (CNTL2) activates the sample modifier 510 so that one of the samples of the series of samples is modified. The output of the sample modifier 510 represents a next portion of the time-domain training sequence.

In this embodiment, the time-domain training sequence can be considered to be composed of a plurality of pairs of blocks of samples. For each pair of blocks, the samples within the blocks are the same except for one sample. Hence, the pseudo-random sequence generator 502 can generate the samples which can be output for a first block of the pair of blocks and at the same time store the block in the memory 508. Thereafter, the block of samples can be acquired from the memory 508, one of which is then modified by the sample modifier 510, and the output is then a second block of the pair of blocks.

The time-domain training sequence can be generated directly in the time domain as illustrated in FIGS. 4 and 5. Alternatively, as shown in FIGS. 6 and 7, the time-domain training sequence can also be initially generated in the frequency domain and then transformed to the time domain.

Figure 6:
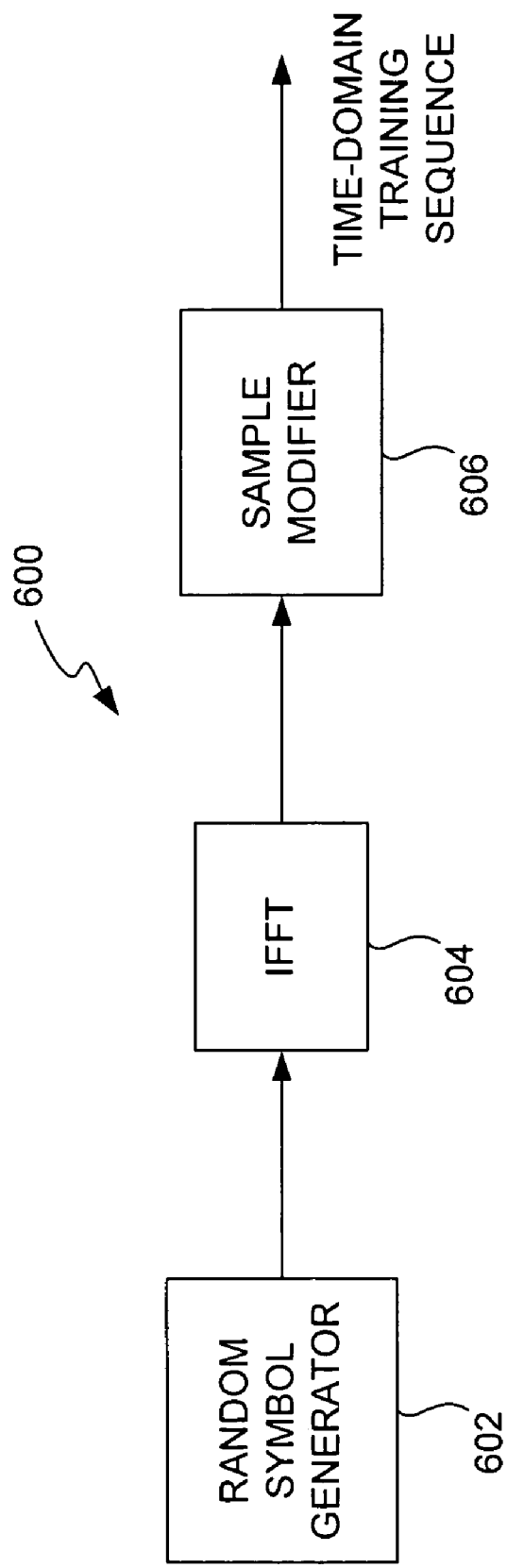
FIG. 6 is a block diagram of a training sequence generator according to still another embodiment of the invention.

FIG. 6 is a block diagram of a training sequence generator 600 according to still another embodiment of the invention. The training sequence generator 600 includes a random symbol generator 602 that generates a series of frequency-domain symbols. For example, the frequency-domain symbols can be Quadrature Amplitude Modulated (QAM) symbols. The frequency-domain symbols are then supplied to an IFFT 604. The IFFT 604 converts the frequency-domain symbols into time-domain samples. The time-domain samples are then supplied to a sample modifier 606. The sample modifier 606 modifies one sample out of a series of samples. The output of the sample modifier 606 represents a time-domain training sequence.

Figure 7:
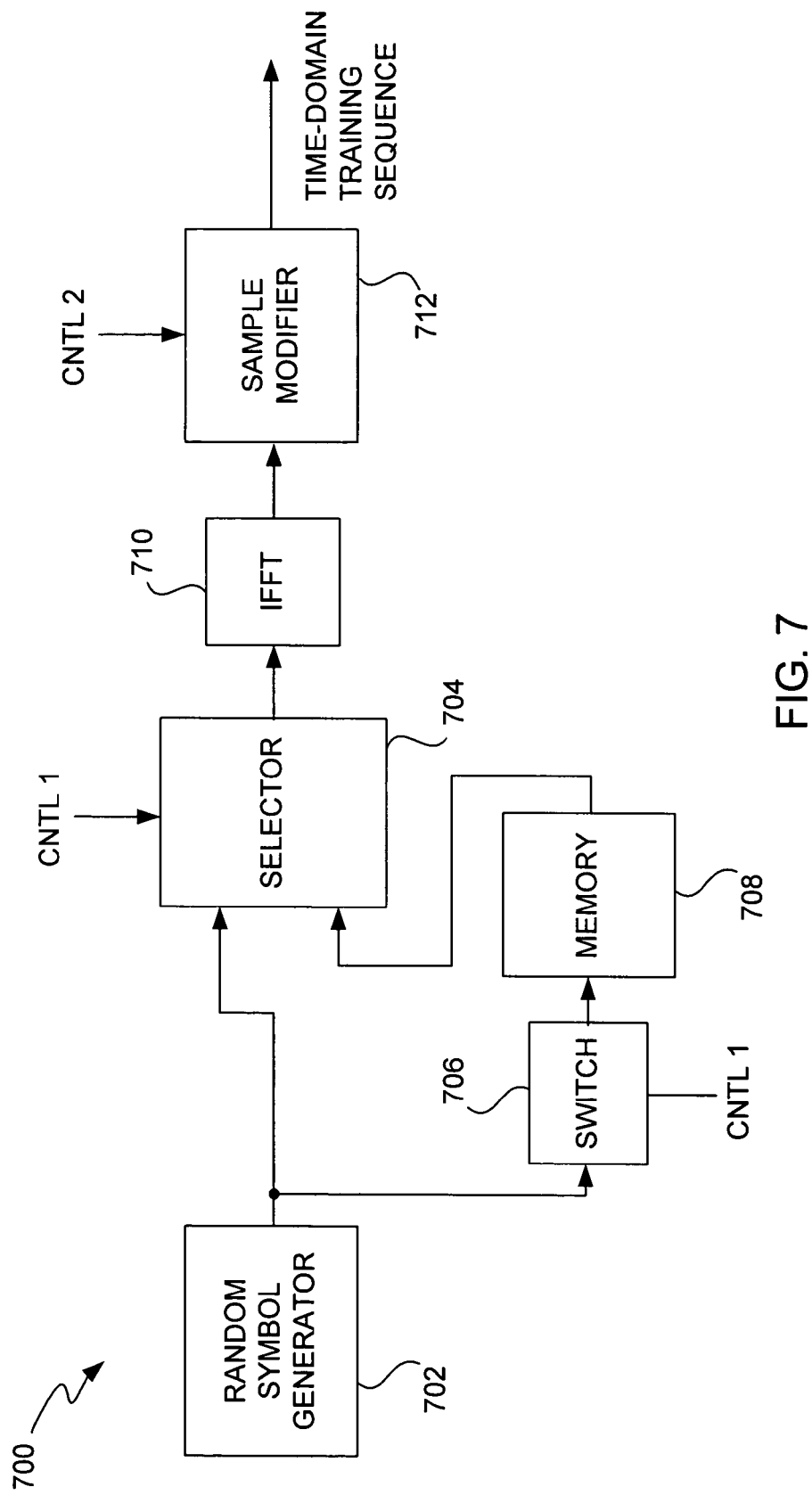
FIG. 7 is a block diagram of a training sequence generator according to yet another embodiment of the invention.

FIG. 7 is a block diagram of a training sequence generator 700 according to yet another embodiment of the invention. The training sequence generator 700 is, for example, a detailed embodiment of the training sequence generator 600 illustrated in FIG. 6.

The training sequence generator 700 includes a random symbol generator 702 that produces a series of frequency-domain symbols. For example, the frequency-domain symbols can be QAM symbols. The frequency-domain symbols are supplied to a selector 704 and a switch 706. The selector 704 and the switch 706 operate under the control of a first control signal (CNTL1). In a first mode, the switch 706 passes the frequency-domain symbols to a memory 708. The selector 704 selects either the frequency-domain symbols from the random symbol generator 702 or the frequency-domain symbols previously generated and stored in the memory 708. In the first mode, the selector 704 selects the frequency-domain symbols generated by the random symbol generator 702. In a second mode, the selector 704 selects the frequency-domain symbols stored in the memory 708. In either case, the output of the selector 704 is frequency-domain symbols which are supplied to an IFFT 710. The IFFT 710 converts the frequency-domain symbols into time-domain samples. The time-domain samples are supplied to a sample modifier 712. Under the control of a second control signal (CNTL2), one of the samples within a series of samples is modified to ensure a particular non-circular condition with respect to a counterpart series. The outputs of the sample modifier 712 are the time-domain samples that together form the time-domain training sequence.

Regardless of how the time-domain training sequence is generated, the time-domain training sequence is transmitted by a transmitter to one or more receivers over a channel. Typically, the channel is embodied by a wireline connection, such as a twisted-pair copper wire connection.

Figure 8A:
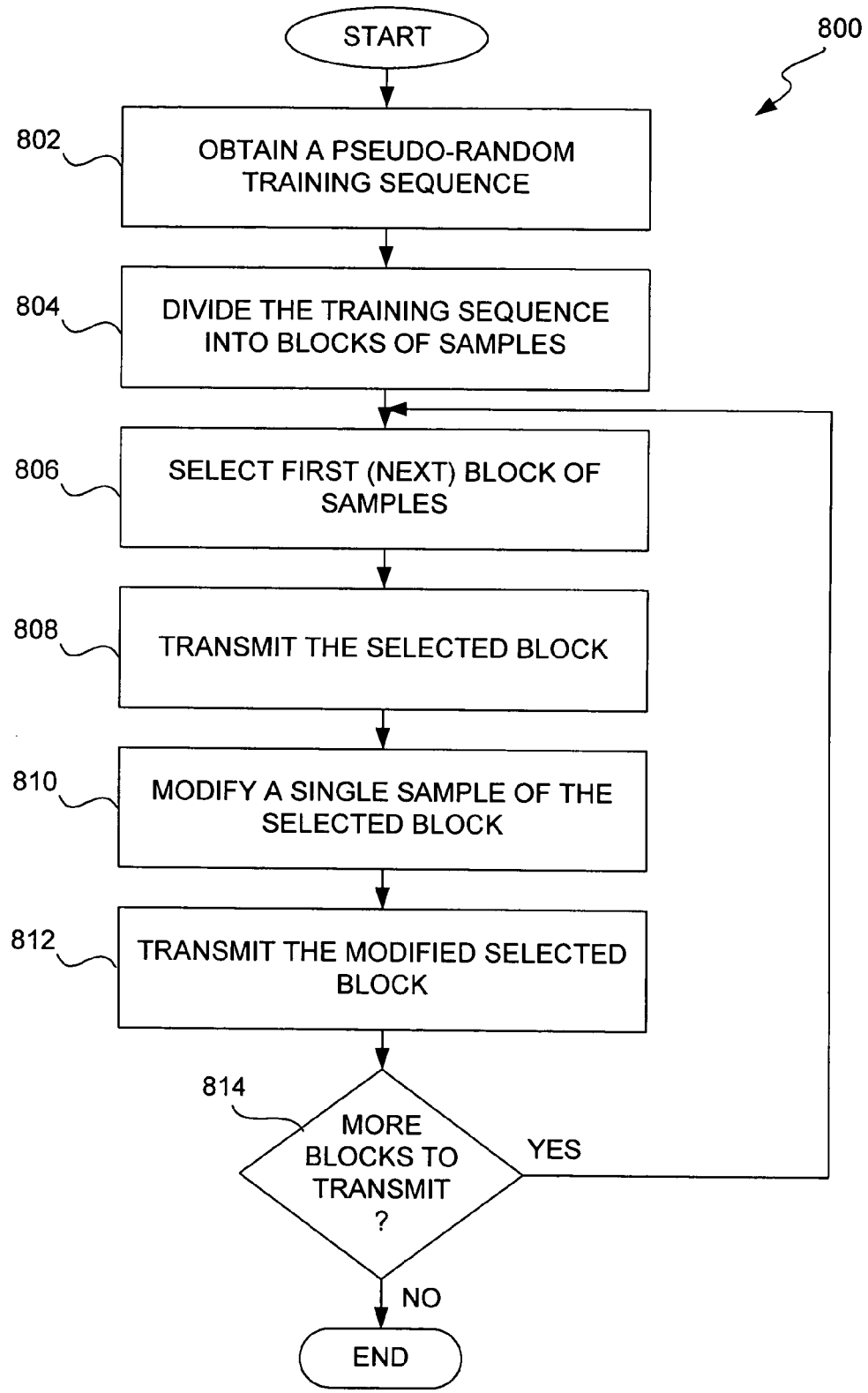
FIG. 8A is a flow diagram of a training sequence transmission process according to one embodiment of the invention.

FIG. 8A is a flow diagram of a training sequence transmission process 800 according to one embodiment of the invention. The training sequence transmission process 800 obtains 802 a pseudo-random training sequence. The pseudo-random training sequence is, in this embodiment, a series of time-domain samples. The series of time-domain samples can be obtained from: (i) hardware performing an equation, (ii) a shift register structure, (iii) a lookup table, or (iv) some other means to produce a time-domain, pseudo-random training sequence. Once the training sequence has been obtained 802, the training sequence is divided 804 into blocks of samples. Then, a first block of the samples is selected 806. The selected block is then transmitted 808. Then, a single sample of the selected block is modified 810. Then, the modified selected block is transmitted 812. Thereafter, a decision 814 determines whether there are more blocks to be transmitted. When the decision 814 determines that there are more blocks to be transmitted, the training sequence transmission process 800 returns to repeat the operation 806 for a next block of samples. Once the decision 814 determines that there are no more blocks to be transmitted, the training sequence transmission process 800 is complete and ends.

Although FIG. 8A shows the pseudo-random training sequence being obtained 802 and divided 804 into blocks, it should be understood that only a portion (e.g., block) of the pseudo-random training sequence needs to be obtained prior to each iteration of operation 808. As such, in another embodiment of the training sequence transmission process 800, the operations 802 and 804 can be eliminated, and the operation 806 can serve to obtain a block of samples to be transmitted. Hence, each of the block of samples can be retrieved or generated as needed.

Figure 8B:
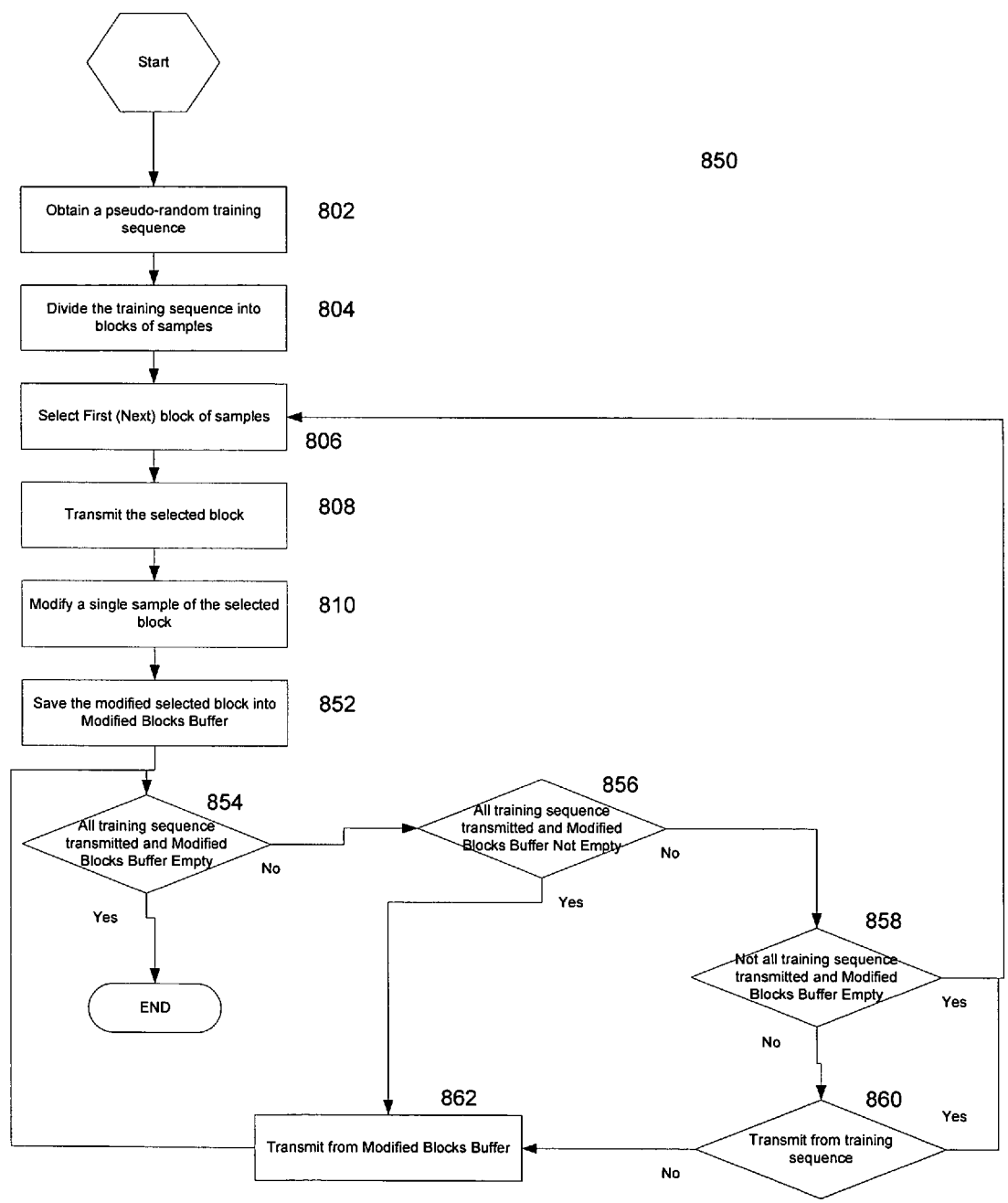
FIG. 8B is a flow diagram of a training sequence transmission process according to one embodiment of the invention.

FIG. 8B is a flow diagram of a training sequence transmission process 850 according to one embodiment of the invention. The training sequence transmission process 850 includes blocks 802-810 that are the same as the training sequence transmission process 800 shown in FIG. 8A. Additionally, the training sequence transmission process 850 operates to describe an embodiment in which a selected block and its modified selected block counterpart can be transmitted in various different sequences or arrangements through assistance of a modified blocks buffer. More particularly, after the modified selected block is formed at block 810, the modified selected block is saved 852 to the modified blocks buffer. Next, a decision 854 determines whether the modified blocks buffer is empty and the entire training sequence has been transmitted. If both the modified blocks buffer is empty and the entire training sequence has been transmitted, then the training sequence transmission process 850 is complete and ends.

On the other hand, when the modified blocks buffer is not empty or the entire training sequence has not been transmitted, a decision 856 determines whether the entire training sequence has been transmitted and the modified blocks buffer is not empty. When these conditions are not both met, a decision 858 determines whether the modified blocks buffer is empty and the entire training sequence has not been transmitted. If these conditions are met, the training sequence transmission process 850 returns to repeat the block 806 and subsequent blocks so that additional blocks of the training sequence can be similarly processed.

Alternatively, when the decision 858 determines the modified blocks buffer is not empty or the entire training sequence has been transmitted, a decision 860 determines whether a block should be transmitted from the training sequence or the modified blocks buffer. When the decision 860 determines that the block should be transmitted from the training sequence, the training sequence transmission process 850 returns to repeat the block 806 and subsequent blocks so that an additional block of the training sequence can be processed. When the decision 860 determines that the block should be transmitted from the modified blocks buffer, a block is transmitted 862 from the modifier blocks buffer. Additionally, when the decision 856 determines that the entire training sequence has been transmitted and the modified blocks buffer is not empty, a block is also transmitted 862 from the modifier blocks buffer. Following the block 862, the training sequence transmission process 850 returns to repeat the decision 854 and subsequent blocks.

The training sequence transmission processes 800 and 850 illustrated in FIGS. 8A and 8B can be associated with the training sequence generators 400 and 500 shown in FIGS. 4 and 5. However, the training sequence generators 600 and 700 shown in FIGS. 6 and 7 operate in the frequency domain and then convert to the time domain and could use similar processing to that shown in FIGS. 8A and 8B.

In other embodiments, a training sequence transmission process can provide a series of samples, insure that a single sample difference is provided either with respect to parts of the series or with respect to another series of samples, and then transmit the series. As an example, for a pair of series (e.g., blocks) of samples such as described in Equation 6 above for the series $x_1$ and $x_2$, the pair of series are identical other than for a single sample (e.g., samples p and q).

The training sequence according to the invention need not have pairs of series of training samples, such as the series $x_1$ and $x_2$ noted above. According to another embodiment, the length of the training sequence can be reduced while maintaining the same performance. Here, instead of having pairs of individual series of training samples, $x_1$ and $x_2$, each of length N, a single group of samples can be used. The single group of samples can be shorter than the sum of the lengths of the two individual series, namely 2N, yet achieve the same effect. Within the group of samples in this embodiment, the samples should be periodic with a periodicity of T where (T≧M) except for one of the samples, where M is the number of taps of the estimated channel response. Such a differing sample can either be (T−1) samples after the start and (2T−1) samples before the end of the group or (2T−1) samples after the start of the sequence and (T−1) samples before the end of the group. Mathematically, if the index of such a sample within the group is id and the length of the group is K samples long, either of the following constraints should be fulfilled:

$$(T-1) < id < (K-2T+1)$$

or $$(2T-1) < id < (K-T+1)$$

The total length of a group should be at least 3T, containing 3 periods. Since (T≧M), the total length of a group should be at least 3M, compared to 4M in the earlier embodiment.

Figure 9:
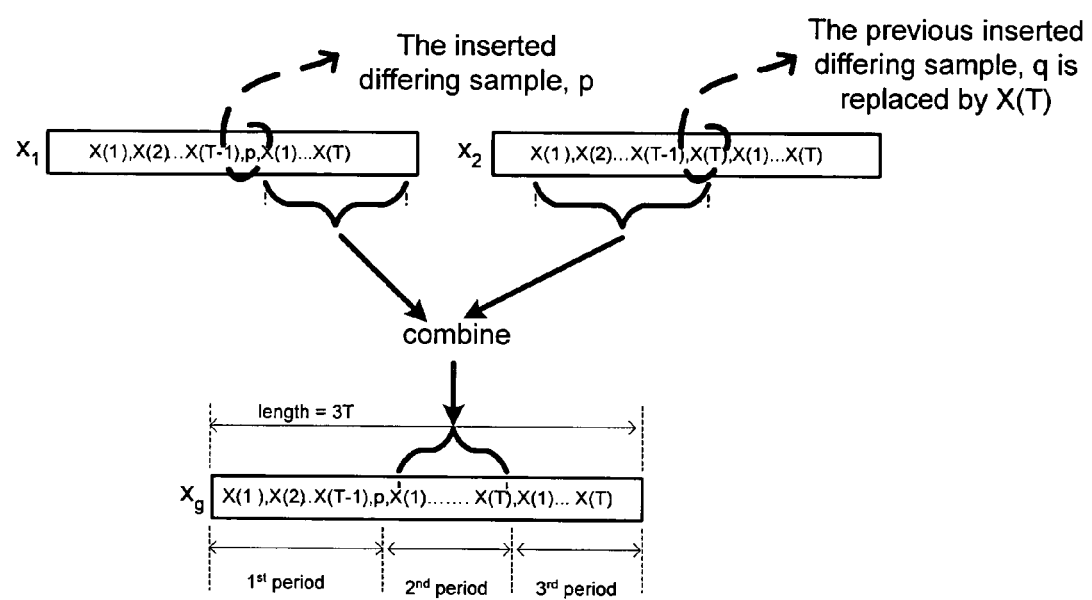
FIG. 9 is a diagram illustrating relationship of a modified training sequence as compared to a non-modified training sequence.

FIG. 9 is a diagram illustrating relationship of a modified training sequence as compared to a non-modified training sequence. Assuming the training signals to be based around a random signal x(1 . . . T), each of the groups of this modified training sequence can be visualized in FIG. 9. Again, each of the groups should be random and be independent of each other. In fact, this embodiment is a special case of the training sequence discussed above (e.g., Equation 6) where the pairs of individual training series are made periodic over N/2, i.e., (set T=N/2) except for one of the samples. That sample would be the $(T)^{th}$ sample of either one of the series of training samples. The last N/2, or T, samples of this series can then be combined with the first N/2, or T, samples of the complete periodic series. The resultant group then constitutes the modified training sequence.

Another embodiment of the training sequence is suitable for use with block-based communication systems. Block-based communication systems include different single and multicarrier modulation systems where signals are transmitted in a block-by-block fashion. In those systems, each block of the samples is often appended with a cyclic prefix and a cyclic suffix. Signal overlapping and symmetric transmit signal windowing are also often performed. To make the training sequence adhere to these systems, the above training sequence can be modified. In this embodiment, three multicarrier symbols can form a group of training samples. Among those three symbols, adjacent ones are phase-shifted versions of each other, with the phase shift amount being the sum of the length of a cyclic prefix and suffix minus beta, (i.e., Lcp+Lcs−β). In addition, one of the samples should be changed to some other value. Again, such a differing sample can either be (T−1) samples after the start and (2T−1) samples before the end of the group or (2T−1) samples after the start of the sequence and (T−1) samples before the end of the group. Mathematically, if the index of such a sample within the group is id and the length of the group is K samples long, either of the following constraints should be fulfilled:

$(T-1) < id < (K-2T+1)$ or $(2T-1) < id < (K-T+1)$

Figure 10:
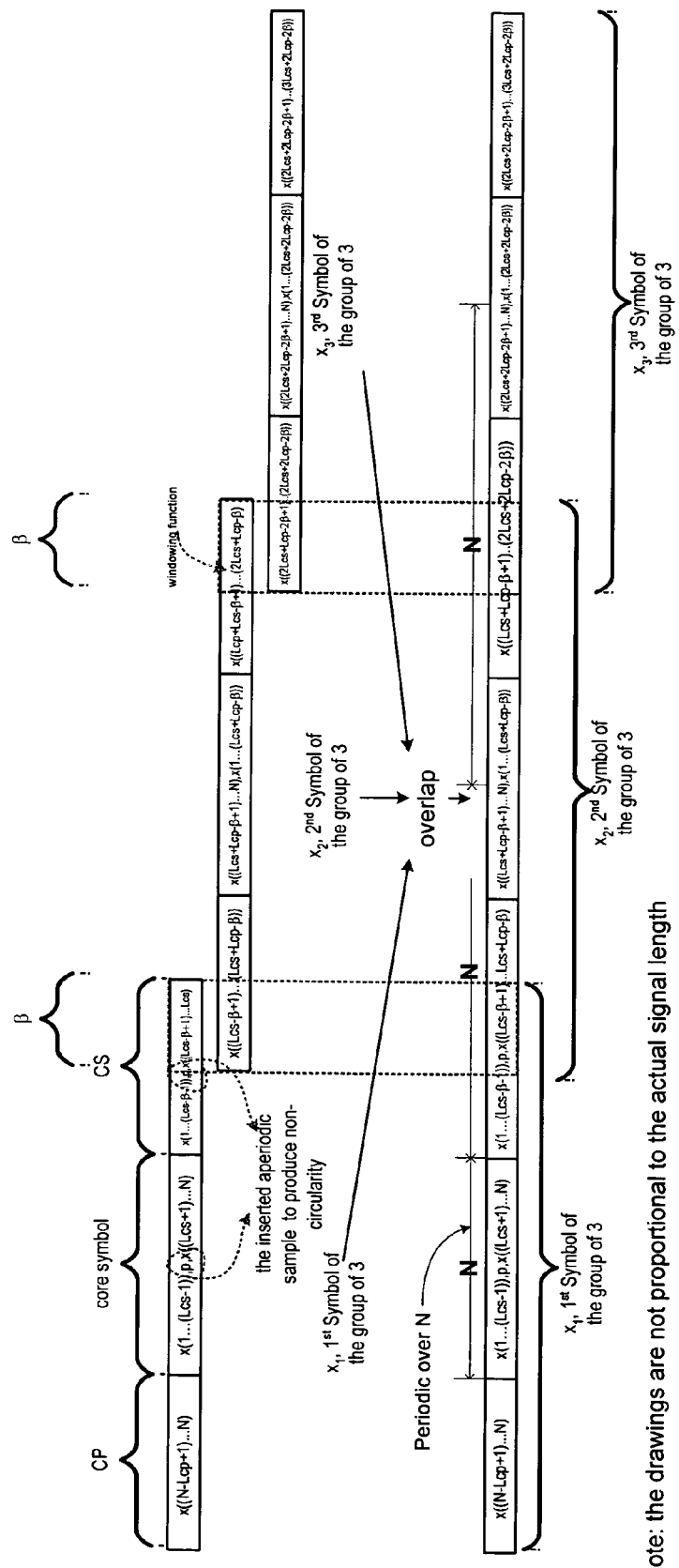
FIG. 10 illustrates a group of three symbols of a training sequence having a base core time-domain symbol.

As in the previous embodiments, the groups should be random and be independent of each other. The resulting transmit sequence of these three symbols, after cyclic prefix and suffix insertion, overlapping and symmetric transmit windowing, would be very similar to the modified training sequence mentioned above. The only difference is the presence of some extra samples (e.g., Lcp and (2(Lcp+Lcs−β)+Lcs) samples) in front and after that modified training sequence. FIG. 10 illustrates a group of three symbols of a training sequence having a base core time-domain symbol of x(1 . . . N).

Another aspect of the invention pertains to channel estimation. Channel estimation at a receiver can be performed using the above-mentioned training sequence. As a result of using the above-mentioned training sequence, the receiver is able to rapidly acquire an accurate channel estimate without requiring substantial additional hardware at the receiver. The channel being estimated at the receiver can be a far-end (or direct) channel or a near-end channel (e.g., echo channel or crosstalk channel). The crosstalk channel would typically be associated with a digital multiple-input/multiple-output communication system. The computational improvements offered by use of the above-mentioned training sequence are examined below.

With the above-mentioned training sequence, the received series of signals at a receiver due to the two special training signal series $x_1$ and $x_2$ can be generalized as follows:

$$\text{rec\_sym}_1(1\ldots N+M-1) = x_1(1\ldots N) \circledast hh(1\ldots M) = \qquad \text{Equation 7}$$
$$[x(1\ldots(M-1))\ldots p\ldots x((M+1)\ldots N)] \circledast hh(1\ldots M)$$

$$\text{rec\_sym}_2(1\ldots N+M-1) = x_2(1\ldots N) \circledast hh(1\ldots M) = \qquad \text{Equation 8}$$
$$[x(1\ldots(M-1))\ldots q\ldots x((M+1)\ldots N)] \circledast hh(1\ldots M)$$

Comparing the two equations, one can try to derive $\text{rec\_sym}_1$ from $\text{rec\_sym}_2$:

$$\text{rec\_sym}_1(1\ldots N+M-1) = \qquad \text{Equation 9}$$
$$x_1(1\ldots N) \circledast hh(1\ldots M) = [x(1\ldots(M-1))$$
$$\ldots p\ldots x((M+1)\ldots N)] \circledast hh(1\ldots M) =$$
$$[x(1\ldots(M-1))\ldots p\ldots x((M+1)\ldots N)] \circledast hh(1\ldots M) -$$
$$\text{rec\_sym}_2 + \text{rec\_sym}_2 =$$
$$\{[x(1\ldots(M-1))\ldots p\ldots x((M+1)\ldots N)] \circledast h$$
$$h(1\ldots M) - [x(1\ldots(M-1))\ldots q\ldots$$
$$x((M+1)\ldots N)] \circledast hh(1\ldots M)\} +$$
$$\text{rec\_sym}_2 = [0\ldots 0(p-q)0\ldots 0] \circledast hh(1\ldots M) +$$
$$\text{rec\_sym}_2$$
$$\Rightarrow \text{rec\_sym}_1(M\ldots 2M-1) = (p-q) \circledast hh(1\ldots M) +$$
$$\text{rec\_sym}_2(M\ldots 2M-1) = \text{rec\_sym}_2$$
$$(M\ldots 2M-1) + (p-q) \cdot hh(1\ldots M)$$

Similarly, one can try to reproduce $\text{rec\_sym}_1$, based on $\text{rec\_sym}_2$ and the estimated channel response $\overline{hh}$. Assume $\overline{\text{rec\_sym}_1}$ to be the approximated version of $\text{rec\_sym}_1$:

$$\overline{\text{rec\_sym}_1}(M\ldots 2M-1) = \text{rec\_sym}_2(M\ldots 2M-1) + (p-q) \cdot \overline{hh}(1\ldots M) \qquad \text{Equation 10}$$

By comparing Equations 9 and 10, it should be clear that by calculating the difference between the approximated $\overline{\text{rec\_sym}_1}$ and the actual received $\text{rec\_sym}_1$, one would be able to obtain an error signal corresponding to the estimated channel taps. In addition, each of the error signal samples would correspond to one, and only one, of the estimated channel taps ($\overline{hh}$). This decoupled relationship is demonstrated in Equation 11 below:

$$\text{err\_sig}(1\ldots M) = \overline{\text{rec\_sym}_1}(M\ldots 2M-1) - \qquad \text{Equation 11}$$
$$= \text{rec\_sym}_1(M\ldots 2M-1)$$
$$= (p-q) \cdot [\overline{hh}(1\ldots M) - hh(1\ldots M)]$$

With this error signal, each of the taps of the estimated time-domain impulse response $\overline{hh}(1\ldots M)$ can be independently updated by different adaptive algorithms, including LMS and RLS adaptation algorithms. The error signal is particularly suitable for use with a LMS-based adaptation algorithm because of its low complexity. The update to the estimated channel taps can be done once for every group of series of samples.

For illustration purposes, a LMS-based channel estimation algorithm is demonstrated below. As a logical extension from Equation 11, $\overline{hh}(1 \ldots M)$ can be estimated through the following equation:

$$\overline{hh}_{t=n+1}(1\ldots M) = \overline{hh}_{t=n}(1\ldots M) - \mu \cdot (p-q) \cdot err\_sig(1\ldots M) \quad \text{Equation 12}$$

where $\mu$ is the LMS update step size, and $\overline{hh}$ is the estimated time-domain channel taps.

In the case where the above-mentioned modified training sequence is being utilized, the estimation based on such training sequence is similar. The only difference is the framing of the received samples. In this case, the framing of rec_sym should be based on the ($1^{st}$ and $2^{nd}$) and the ($2^{nd}$ and $3^{rd}$) periods of the group of training samples. Assuming xg to be the group of training samples, $$rec\_sym_1(1\ldots 2T+M-1) = xg(1\ldots 2T) \circledast hh(1\ldots M) = \\ [x(1\ldots(T-1))\ldots p\ldots x(1\ldots T)] \circledast hh(1\ldots M) \quad \text{Equation 13}$$

$$rec\_sym_2(1\ldots 2T+M-1) = xg(T\ldots 3T) \circledast hh(1\ldots M) = \\ [x(1\ldots(T-1))\ldots x(T)\ldots x(1\ldots T)] \circledast hh(1\ldots M) \quad \text{Equation 14}$$

The rest of the calculation is the same as the non-modified case, with q replaced by x(T).

Figure 11:
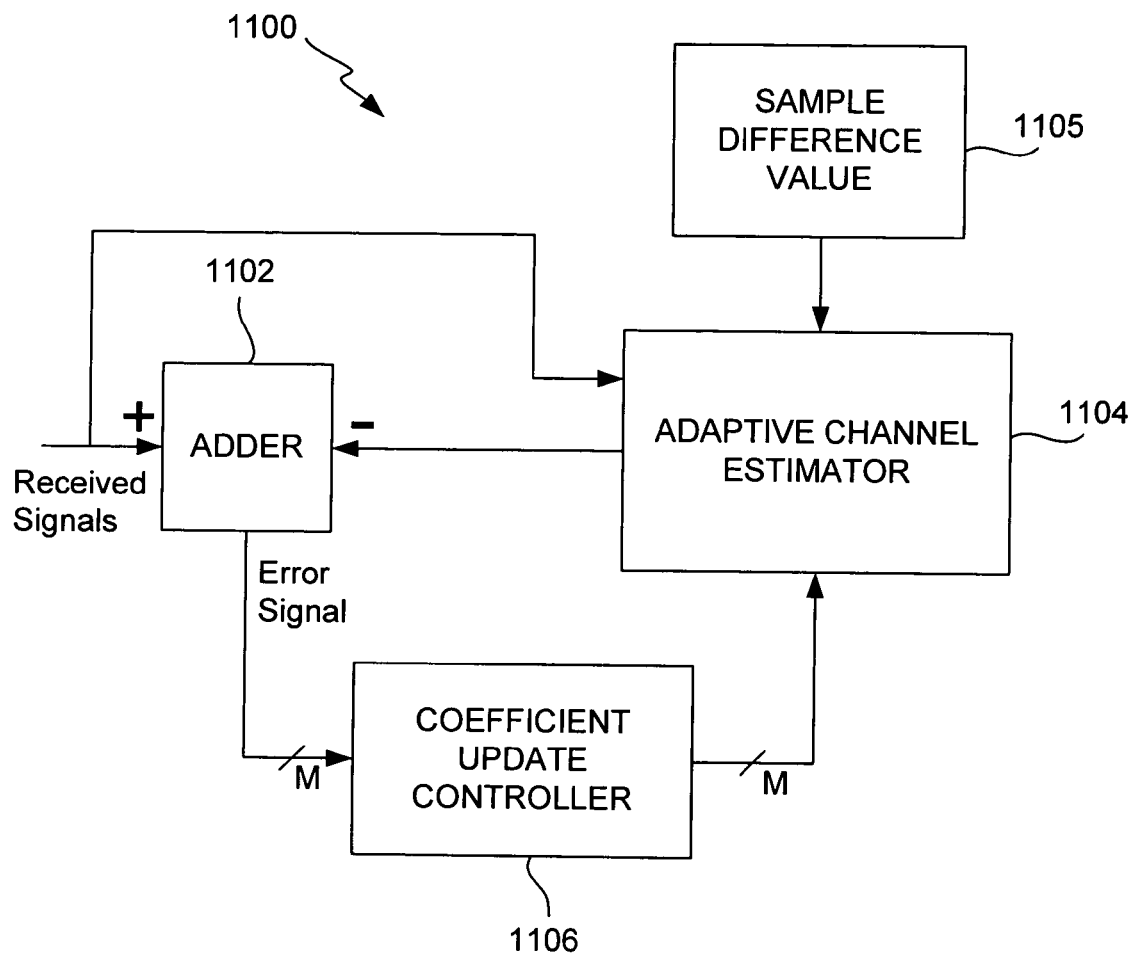
FIG. 11 is a block diagram of channel estimation circuitry according to one embodiment of the invention.

FIG. 11 is a block diagram of channel estimation circuitry 1100 according to one embodiment of the invention. The channel estimation circuitry 1100 resides at a receiver that receives signals that were transmitted by a transmitter over a channel. The received signals are received at an adder 1102. In addition, the channel estimation circuitry 1100 includes an adaptive channel estimator 1104 that receives a sample difference value associated with a training sequence, such as the training sequence noted above. The adaptive channel estimator 1104 also receives coefficient update signals provided by a coefficient update controller 1106. Using the sample difference value, the estimated channel and the received signals, the adaptive channel estimator 1104 produces estimated received signals. The adder 1102 subtracts estimated received signals from the actual received signals to produce error signals. The error signals are supplied to the coefficient update controller 1106 which then in turn outputs the coefficient update signals to the adaptive channel estimator 1104. As a result, the adaptive channel estimator 1104 adapts to cause the error signal to approach zero, thereby providing an accurate estimate of the channel over which the received signals were transmitted. In this regard, the error signal has M components and the coefficient update signals have M components. Each of these M components corresponds to a single one of the M taps associated with the adaptive channel estimator. Accordingly, the channel estimation circuitry 1100 operates in the time domain to produce an accurate channel estimate with rapid convergence but without substantial hardware requirements.

Figure 12A:
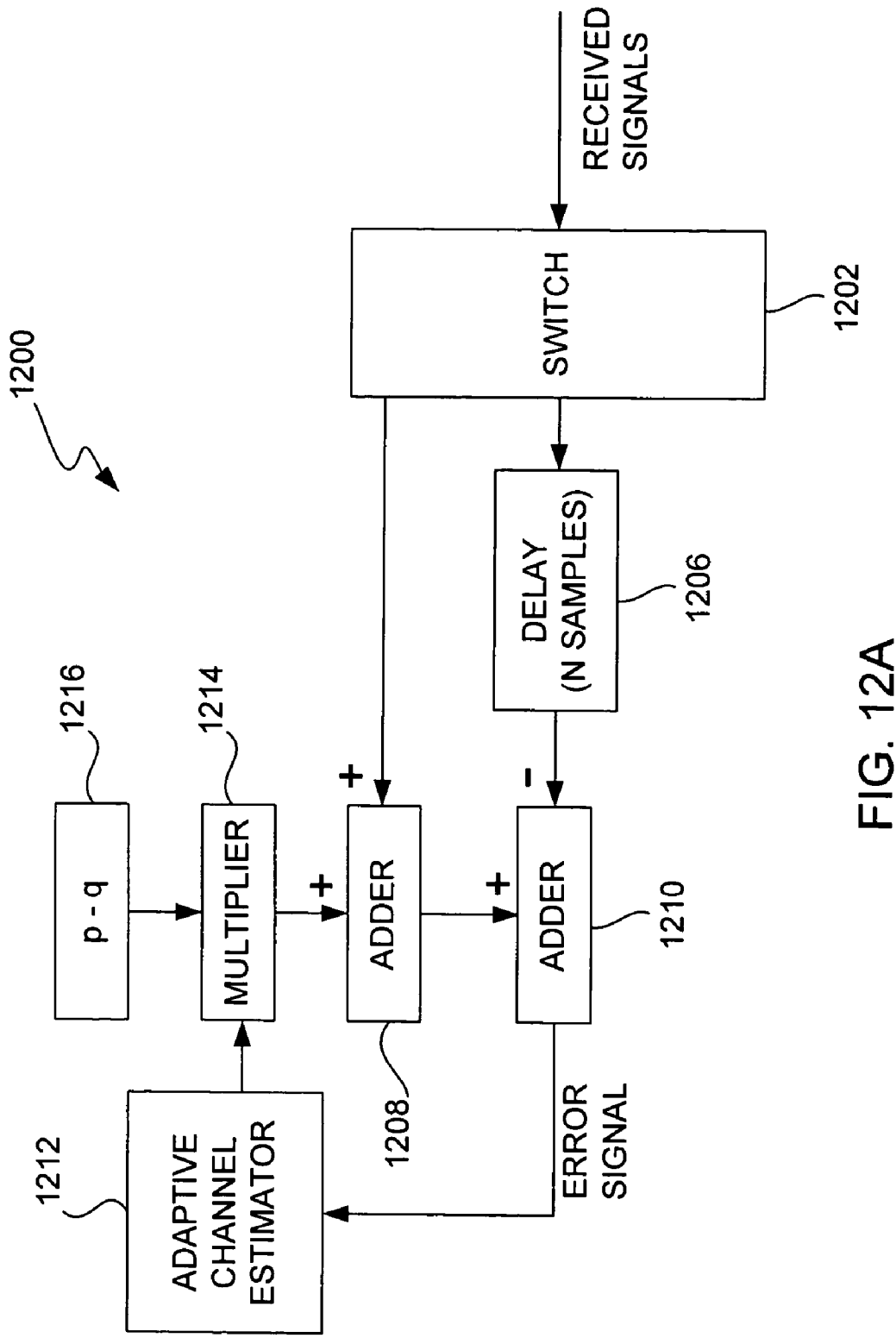
FIG. 12A is a block diagram of channel estimation circuitry according to another embodiment of the invention.

FIG. 12A is a block diagram of channel estimation circuitry 1200 according to another embodiment of the invention. The channel estimation circuitry 1200 includes a switch 1202 that receives signals (received signals) that were transmitted by a transmitter over a channel. The received signals are directed to a delay 1206 or an adder 1208 by the switch 1202. In one implementation, for a series of 2N samples, the first N samples are supplied to the delay 1206 and the next N samples are supplied directly to the adder 1208. The delay 1206 imposes a N sample delay on the received signals provided thereto. The adder 1208 adds a scaled estimated channel from the received signals provided by the switch 1202 to produce estimated first received samples. An adder 1210 subtracts the received signals stored in the memory 1206 from the first estimated received samples to produce an error signal. The error signal has M components so that each of M taps of an adaptive channel estimator 1212 can be independently altered. The adaptive channel estimator 1212 produces an estimated channel that is multiplied by the multiplier 1214 with a difference value 1216. Here, the difference value (p−q) represents the difference between the single corresponding pair of samples of a pair of blocks that are different. The output of the multiplier 1214 is the scaled estimated channel which is the product of the difference values and the estimated channel.

Figure 12B:
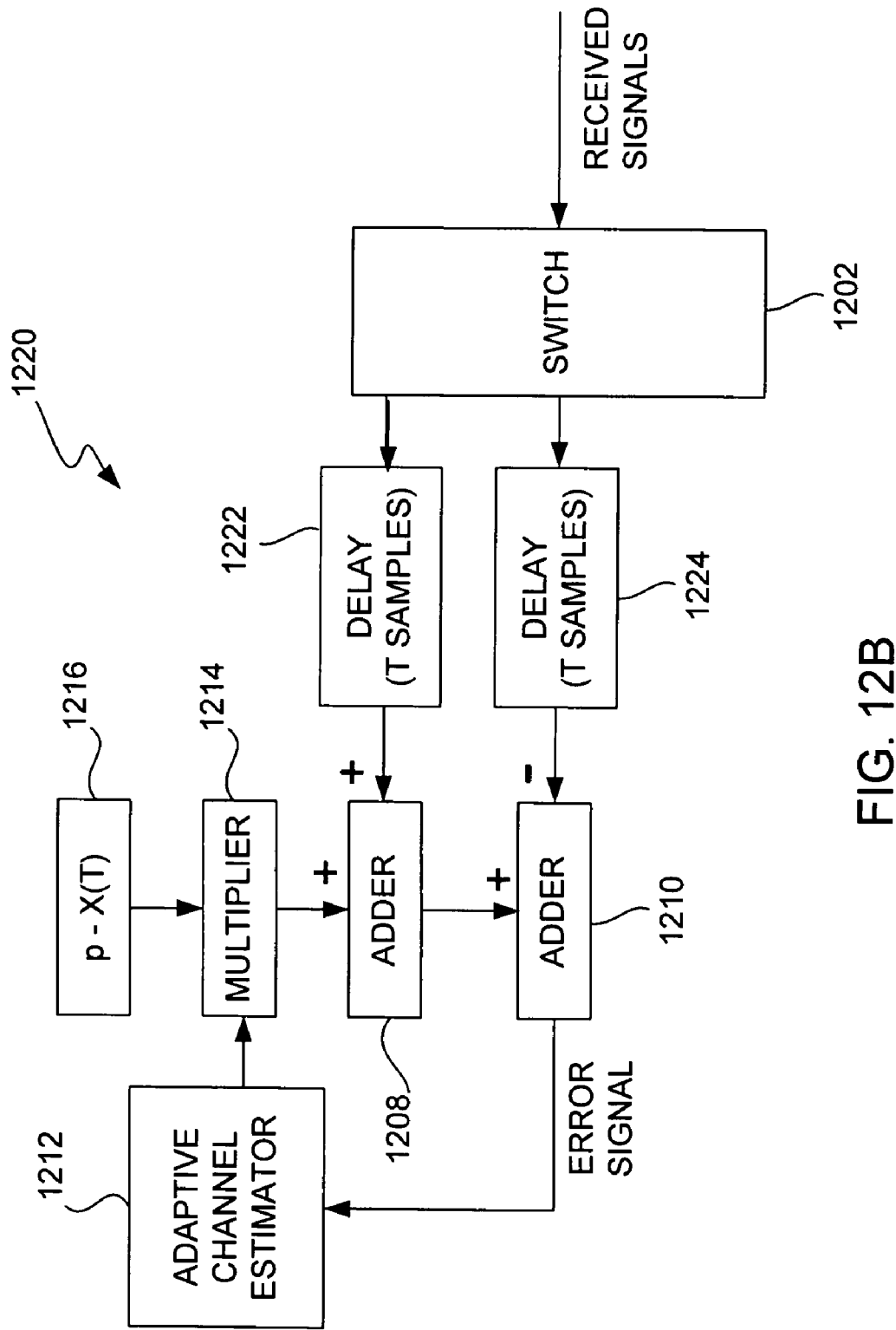
FIG. 12B is a block diagram of channel estimation circuitry according to another embodiment of the invention.

FIG. 12B is a block diagram of channel estimation circuitry 1220 according to another embodiment of the invention. The channel estimation circuitry 1220 is generally similar to the channel estimation circuitry 1200 with the exception that delays 1222 and 1224 are provided. The delays 1222 and 1224 operate to delay the received signals being switched by the switch 1202 into the delay 1222 and the delay 1224. The delays 1222 and 1224 operate to provide a pair of blocks to the adders 1208 and 1210 so that the samples associated with the pair of blocks can be processed with respect to one another. The amount of delay can be T samples. In this embodiment, the difference value (p−X(T)) is used, where p is not equal to X(T). The channel estimation circuitry is, for example, suitable for use with the modified training sequence. In such case, the delays 1222 and 1224 are mutually exclusive. In other words, depending on the placement of the different sample within the group of 3T length, only one of the delays 1222 or 1224 imposes a delay of T samples; the other one of the delays 1222 or 1224 is not present or provides no delay.

Channel estimation can be simultaneously performed in the time domain and the frequency domain. By setting the periodicity of the training signal T to the size of the FFT operation, NFFT, (i.e., T=NFFT) the time-domain impulse response taps can be trained together with the frequency-domain taps. The frequency-domain taps and the impulse response taps are both updated once every group of symbols. The periodicity of the training signal eliminates any inter-symbol interference, i.e., cir_noise in Equation 2. With the circular noise eliminated, the time to estimate the frequency-domain taps can be greatly reduced. To facilitate training in the frequency domain, training symbols can be generated in the frequency domain first and then transformed into the time domain.

The time-domain impulse response is estimated as described above. The frequency-domain response is estimated similar to the conventional frequency-domain channel estimation process. First, the frequency-domain received samples are obtained by taking a FFT on NFFT consecutive samples of the received signals. Depending on the location where the differing sample is inserted in the transmit sequence, a different location for framing the NFFT consecutive samples would be selected. In general, any of the NFFT consecutive samples framed should be at least M samples away from the differing sample in the corresponding training signal group. As an example, if the differing sample is inserted at the $T^{th}$ sample of the sequence, the last NFFT samples corresponding to the training signal group can be framed for the FFT operation as follows:

$$REC\_SYM(1\ldots NFFT) = \\ FFT(xg((3T-NFFT+1)\ldots(3T)) \circledast hh(1\ldots M)) = \\ FFT(x(1\ldots T) * hh(1\ldots M)) = \\ X(1\ldots NFFT) \cdot HH(1\ldots NFFT) \quad \text{Equation 15}$$

where HH is the frequency-domain version of the actual channel; and X is the frequency-domain version of the random training signal x(1 . . . T).

An approximated version of REC_SYM, namely $\overline{REC\_SYM}$, is also calculated based on an estimated frequency-domain channel response, $\overline{HH}$. The equation is shown below:

$$\overline{REC\_SYM}(1 \ldots NFFT) = X(1 \ldots NFFT) \cdot \overline{HH}(1 \ldots NFFT)) \quad \text{Equation 16}$$

where $\overline{HH}$ is the frequency-domain version of the estimated channel.

The error signal, ERR_SIG, is formed by calculating the difference between the two versions of the received symbol, as stated in the equation below. Each sample of the error signal directly relates to a single frequency-domain channel tap. This error signal can therefore be used for independent update of each of the frequency-domain channel taps. The update can be done by a different adaptation algorithm, including LMS and RLS.

$$ERR\_SIG(1 \ldots NFFT) = \quad \text{Equation 17}$$
$$REC\_SYM(1 \ldots NFFT) - \overline{REC\_SYM}(1 \ldots NFFT) =$$
$$X(1 \ldots NFFT) \cdot \overline{HH}(1 \ldots NFFT) -$$
$$X(1 \ldots NFFT) \cdot HH(1 \ldots NFFT) =$$
$$X(1 \ldots NFFT) \cdot (\overline{HH}(1 \ldots NFFT) - HH(1 \ldots NFFT))$$

For illustration purposes, a LMS based channel estimation algorithm is demonstrated below. For a particular tap of the frequency-domain response, i, the update is based on the following equation:

$$\overline{HH}_{t=n+1}(i) = \overline{HH}_{t=n}(i) - \mu \cdot conj(X(i)) \cdot ERR\_SIG(i) \quad \text{Equation 18}$$

where μ is the LMS update step size.

As it is shown above and in FIG. 12C, such a training scheme advantageously eliminates the need of an extra FFT/IFFT block to produce the frequency or time-domain channel response.

The above-mentioned simultaneous estimation of time and frequency-domain channel taps can be used in many different systems. The combined time-frequency-domain echo cancellation scheme is one of those. Both the frequency taps and impulse response taps can be estimated with the techniques of the invention.

Figure 12C:
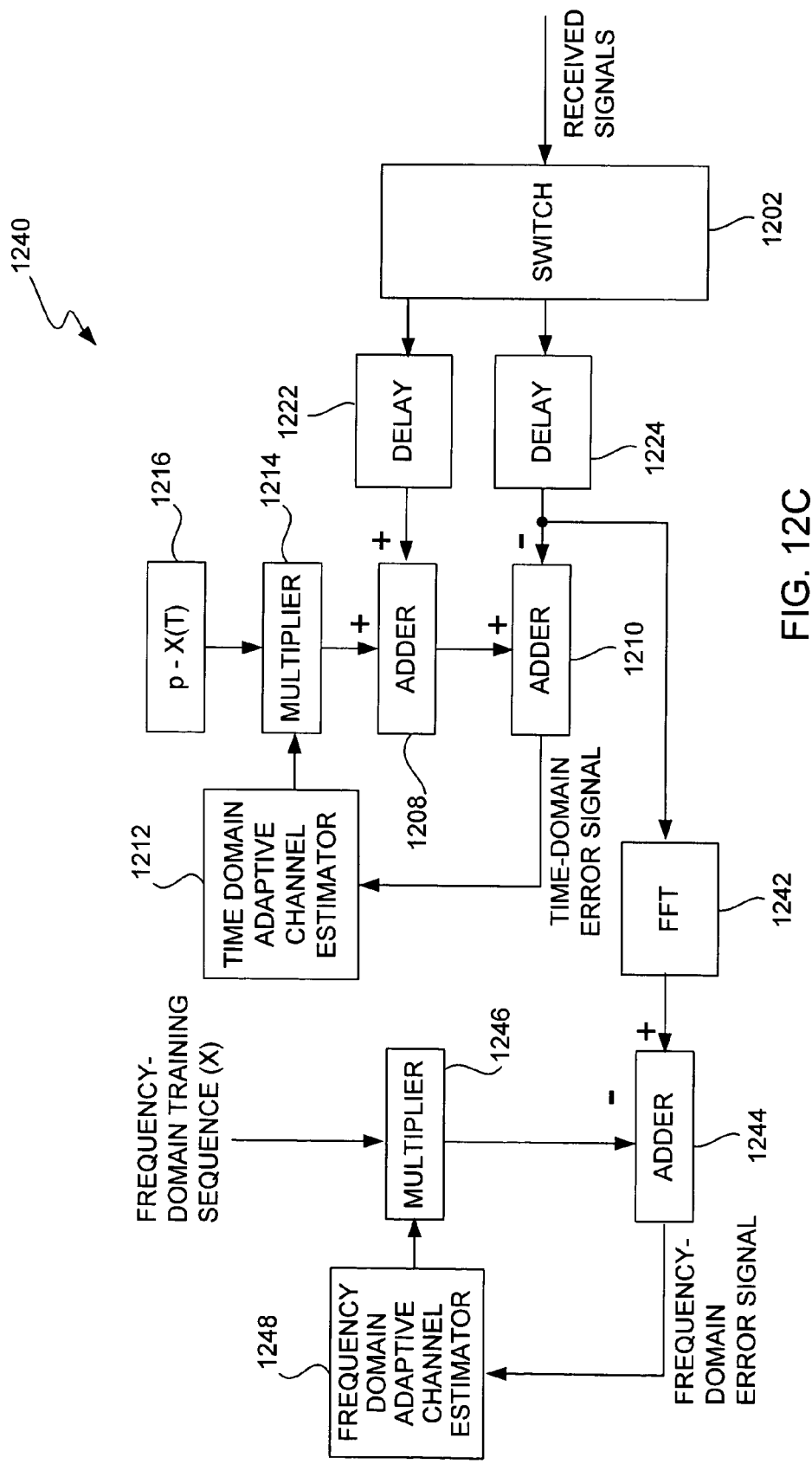
FIG. 12C is a block diagram of channel estimation circuitry according to still another embodiment of the invention.

FIG. 12C is a block diagram of channel estimation circuitry 1240 according to still another embodiment of the invention. The channel estimation circuitry 1240 includes time-domain channel estimation circuitry such as shown in FIG. 12B, but additionally provides frequency-domain channel estimation circuitry. In this regard, the channel estimation circuitry 1240 operates to adaptively estimate the channel in not only the time domain but also the frequency domain.

The additional circuitry provided within the channel estimation circuitry 1240 for the frequency-domain channel estimation, includes a FFT 1242, an adder 1244, a multiplier 1246 and a frequency-domain adaptive channel estimator 1248. The FFT 1242 receives the time-domain block of samples of certain received signals and converts them into frequency-domain samples. The frequency-domain samples are supplied to the adder 1244 which subtracts estimated frequency-domain samples from the frequency-domain samples provided by the FFT 1242. The adder 1244 produces a frequency-domain error signal that is supplied to the frequency-domain adaptive channel estimator 1248. The frequency-domain adaptive channel estimator 1248 outputs a frequency-domain estimated channel. The frequency-domain estimated channel is multiplied with a frequency-domain training sequence (X) at the multiplier 1246 to produce the estimated frequency-domain samples which are supplied to the adder 1244. The frequency-domain training sequence (X) can be obtained locally at the receiver including the channel estimation circuitry 1240.

Figure 12D:
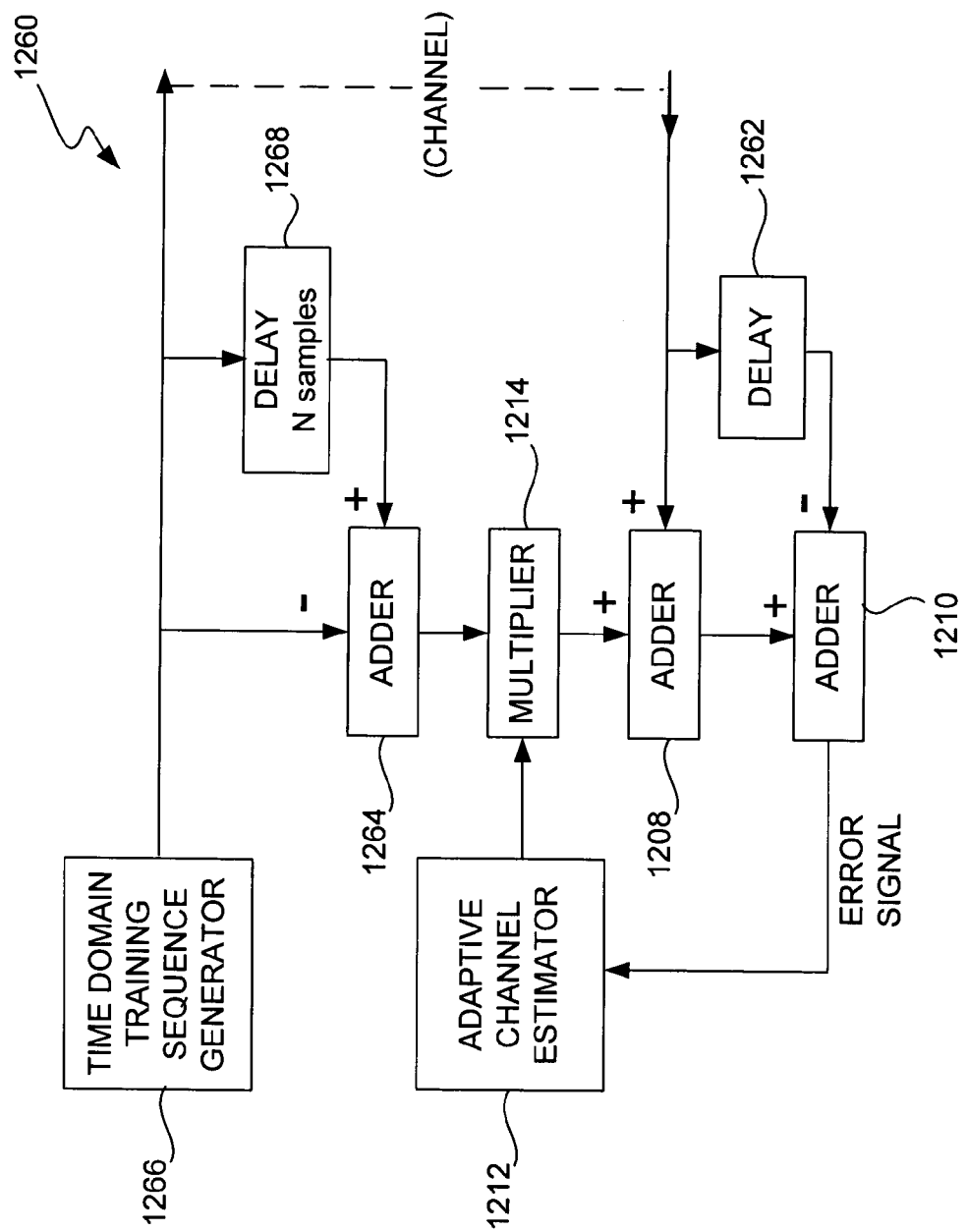
FIG. 12D is a block diagram of channel estimation circuitry according to yet another embodiment of the invention.
Figure 13A:
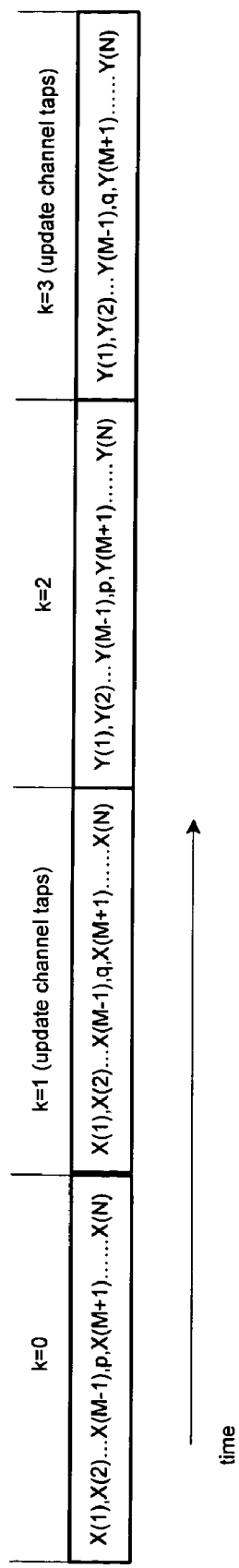
FIGS. 13A-13D are representative timing diagrams that respectively correspond to the channel estimation circuitry shown in FIGS. 12A-12D.
Figure 13B:
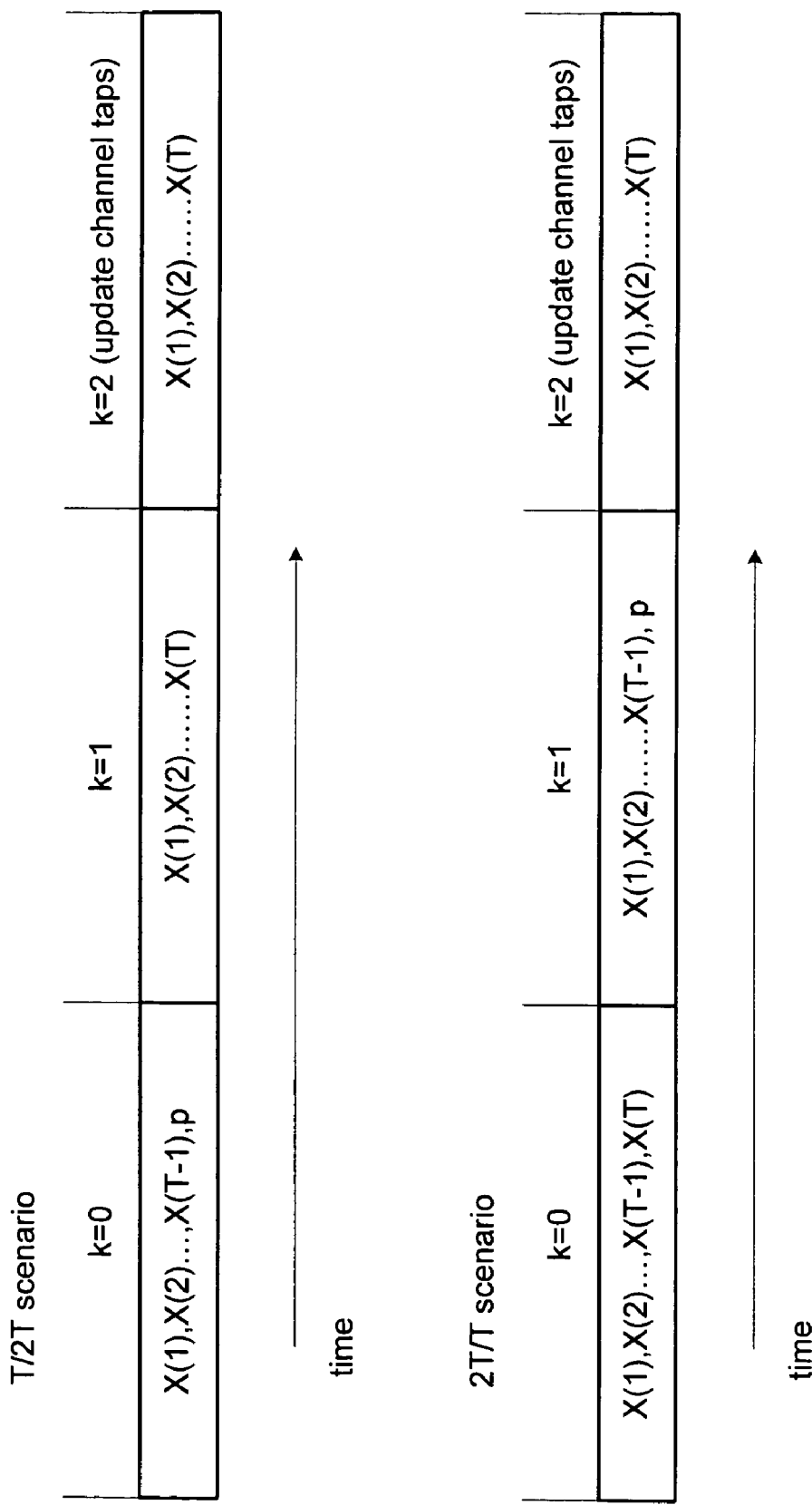
Figure 13C:
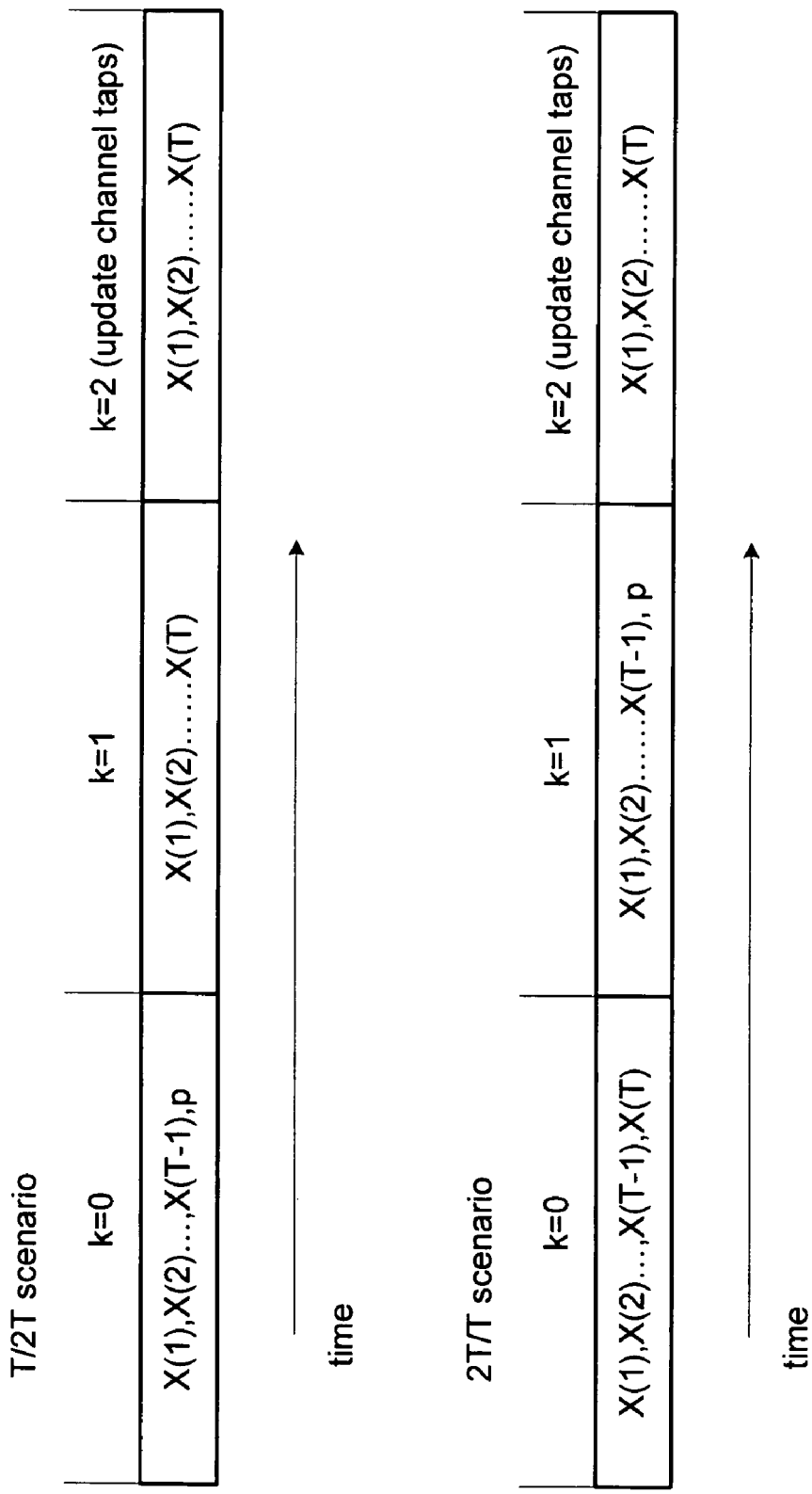
Figure 13D:
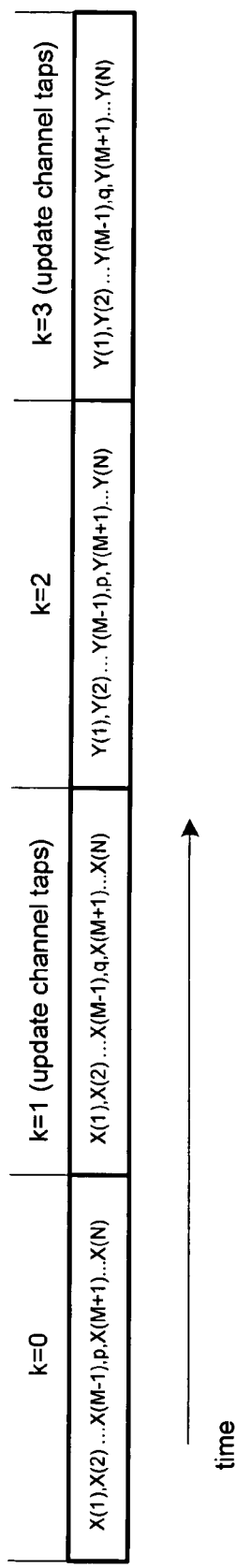

FIG. 12D is a block diagram of channel estimation circuitry 1260 according to yet another embodiment of the invention. The channel estimation circuitry 1260 represents channel estimation for an echo channel that results between a receiver and a transmitter of a transceiver. In this case the channel is referred to as a near-end channel. The channel estimation circuitry 1260 includes the adder 1208, the adder 1210, the adaptive channel estimator 1212 and the multiplier 1214 that were previously discussed above with respect to other embodiments. Additionally, the channel estimation circuitry 1260 includes a delay 1262. The delay 1262 delays a first block of samples from a subsequent block of samples that are to be processed at the same time. For example, if the delay 1262 is N samples in duration, then the first N samples of a block would be supplied to the adder 1210 after the N sample delay, which is the same time the second N samples of the block would be provided to the adder 1208. Further, in this embodiment, an adder 1264 provides the sample difference value (e.g., p−q) to the multiplier 1214. The adder 1264 produces the sample difference value by extracting the appropriate sample values generated by a time-domain training sequence generator 1266. For example, the first block of a pair of blocks can be delayed at a delay 1268 so as to provide the sample value p to the adder 1264, while a second block of the pair of blocks can supply the sample value q to the adder 1264. Hence, the adder 1264 can subtract the q sample value from the p sample value to produce the sample difference value (i.e., p−q).

FIGS. 13A-13D are representative timing diagrams that respectively correspond to the channel estimation circuitry shown in FIGS. 12A-12D. The timing diagrams show received samples of a training sequence and when channel taps are updated. The index k is the index of the transmitted sample with respect to the training sequence.

The adaptive channel estimators utilized above typically have a plurality of taps associated therewith. At the start of channel estimation, the taps can be initialized. In one embodiment, the difference between $rec\_sym_1$ and $rec\_sym_2$ can be calculated and then be divided by the difference of the two differing training transmit samples. This is illustrated by the following equation:

$$\overline{hh}(1 \ldots M) = [rec\_sym_1(M \ldots 2M) - rec\_sym_2(M \ldots 2M)] / \quad \text{Equation 19}$$
$$(p - q) = [rec\_sym_2(M \ldots 2M) + (p - q) \cdot hh(1 \ldots M) -$$
$$rec\_sym_2(M \ldots 2M)] / (p - q) =$$
$$(p - q) \cdot hh(1 \ldots M) / (p - q) = hh(1 \ldots M)$$

The invention is applicable to both Single-In-Single-Out (SISO) systems and Multiple-In-Multiple-Out (MIMO) systems. In SISO systems, the training sequence can be used to train-up the direct and echo channel. The two channels can be trained either separately or jointly. Initialization, however, should be done in a coordinated manner. When taps of a channel are being initialized, the other transmitter should not transmit any signal and should be turned off. In MIMO systems, the training sequence can be used to train-up the direct, echo, far-end crosstalk and near-end crosstalk channel. All the channels can be trained either separately or jointly. As in the SISO case, initialization should be done in a coordinated manner. When taps of a channel are being initialized, all the other transmitters should not transmit any signal and should be turned off.

For the combined time-frequency-domain echo cancellation scheme, the training scheme according to the invention can be applied with several optimizations. The sharing of a circular signal reconstruction block allows for hardware simplification. In training, it serves as a block for generating the error signal. In actual showtime operation, it serves as a block for reconstructing the circular echo for frequency-domain echo cancellation.

Additional simplification is brought about by the fact that only a subset of the impulse channel taps are required for echo cancellation. The estimated impulse response is used for circular echo reconstruction. In a multicarrier communication system, cyclic extension (of length Lce) is often appended to a symbol to help maintain circularity. As a result, the required number of estimated impulse response taps is (M−Lce), where M is the length of the impulse response. The training scheme according to the invention enables independent update of the individual impulse response taps. Therefore, for any impulse response taps that are unnecessary, their training can be simply excluded from the estimation process. The channel estimation circuitry 1260 shown in FIG. 12D can operate in this manner.

In some cases, the channel impulse response can be estimated during user data transmission (e.g., showtime). The reliance of a special training sequence means that it is impossible to utilize the same training method during actual user data transmission (e.g., showtime) operation to track the changes in the channel response. While the tracking of time-domain impulse response is impossible, the tracking of the frequency-domain response is still possible, where the error signals are derived through a slicer by calculating the difference between the hard and soft symbols. If the relationship of FFT/IFFT holds between the frequency response and the time-domain response, the frequency-domain taps that are updated with the tracked changes can be used to provide the time-domain impulse response. However, as mentioned above, such a relationship often fails to hold. This is because the frequency-domain estimation often fails to provide a correct estimation for the taps in the stop bands where transmission of training signals is forbidden. In this case, the IFFT transformation of the frequency-domain taps would not provide a correct time-domain impulse response due to the missing channel response information in the stop bands.

Fortunately, however, with the time-domain impulse response estimated during the training phase, the frequency-domain channel taps in the stop bands can be approximated. This is done by the FFT transformation of the time-domain impulse response. At the end of the training phase, the time-domain impulse response taps are FFT transformed into frequency-domain taps. The frequency-domain channel taps in the stop bands of such a response are combined with those taps in the active bands of the response estimated in the frequency domain to form a frequency-domain response that spans the full band. In subsequent showtime operation, tracking can be done in the frequency domain as mentioned above. Only those frequency taps in the active bands are updated. The frequency taps in the stop bands originally approximated from the impulse response taps remain unchanged. The time-domain impulse response taps can then be tracked through offline IFFT transformation from the frequency-domain taps.

The invention can be implemented by software, hardware or a combination of hardware and software. The hardware can be custom circuitry, customized circuitry (ASIC) and/or general circuitry (e.g., digital signal processor). The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

The advantages of the invention are numerous. Different embodiments or implementations may, but need not, yield one or more of the following advantages.

One advantage of the invention is that time-domain training sequences can be used to obtain a channel estimate with rapid convergence and without burdensome hardware requirements. Another advantage of the invention is that each tap of a multi-tap filter used in estimating a channel can be individually updated so that convergence to a channel estimate is rapid. Still another aspect of the invention is that complex convolution operations are not required in determining a channel estimate. Yet another advantage of the invention is the ability to accurately determine channel estimates in a single carrier or multicarrier data transmission system.

The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A data transmission system for using a training sequence to produce a channel estimate, the system comprising: a receiver that receives a series of blocks of training samples, wherein each block of the series of blocks includes a predetermined number of training samples, and wherein for a given pair of the blocks of training samples, all samples in the given pair of the blocks of training samples are of identical value except for one particular sample in a first of the pair of blocks that is different in value from the identical values; and channel estimation circuitry which uses the sample different in value to update individual taps of the channel estimate independently of other taps by computing a function of (a) a difference between (1) the sample different in value in the first block and (2) an other sample of the samples from a second of the pair of blocks of training samples, and (b) the channel estimate.

2. A system as recited in claim 1, wherein the series of the blocks of training samples are all time-domain training samples.

3. A system as recited in claim 1, wherein the training samples are generated and transmitted from a transmitter of the data transmission system.

4. A system as recited in claim 3, wherein the data transmission system is a multicarrier data transmission system.

5. A system as recited in claim 4, wherein the multicarrier data transmission system is digital subscriber line system.

6. A system as recited in claim 1, wherein at least the training samples that are identical in the given pairs of blocks have at least a pseudo-random characteristic.

7. A system as recited in claim 1, wherein at least the training samples that are identical in the given pairs of blocks are generated in at least a pseudo-random manner.

8. A system as recited in claim 1, wherein the blocks of the training samples include at least one of a cyclic prefix and a cyclic suffix.

9. A system as recited in claim 1, wherein each of the blocks of the training samples include N samples, and wherein the channel estimate is done using M taps, where N is greater than 2M.

10. A system as recited in claim 9, wherein a position of one particular sample within the blocks of the training symbols is after a (M−1)th sample but before a (N−M+1)th sample.

11. A system as recited in claim 10, wherein the series of the blocks of training samples are all time-domain training samples.

12. A system as recited in claim 11, wherein the data transmission system is a multicarrier data transmission system.

13. A system as recited in claim 12, wherein the multicarrier data transmission system is digital subscriber line system.

14. A system as recited in claim 13, wherein the training samples are generated and transmitted from a transmitter of the multicarrier data transmission system.

15. A system as recited in claim 10, wherein at least the training samples that are identical in the given pairs of blocks have at least a pseudo-random characteristic.

16. A data transmission system for using a training sequence to produce a channel estimate, the system comprising: a receiver that receives a series of blocks of training samples, wherein each block of the series of blocks includes a predetermined number of training samples, and wherein for a given group of the training samples, all the training samples in the given group are periodic with a periodicity of T, except for one sample of the training samples within the given group that is different in periodicity, where T is greater than or equal to the number of taps of a channel estimate; and channel estimation circuitry which uses the training sample different in periodicity to update individual taps of the channel estimate independently of other taps by computing a function of (a) a difference between (I) the training sample different in periodicity in the given group of training samples and (2) an other training sample from the given group of training samples, and (b) the channel estimate.

17. A system as recited in claim 16, wherein the given group has a length of at least 3T.

18. A system as recited in claim 17, wherein the one of the training samples being different in the given group is positioned either (T−1) samples after a start of the given group and (2T−1) samples before a end of the given group or (2T−1) samples after the start of the group and (T−1) samples before the end of the given group.

19. A system as recited in claim 16, wherein the data transmission system is a multicarrier data transmission system.

20. A system as recited in claim 19, wherein the multicarrier data transmission system is digital subscriber line system.

21. A system as recited in claim 16, wherein those of the training samples in the group that are periodic have at least a pseudo-random characteristic.

22. A method for transmitting a training sequence for use in a multicarrier data transmission system to produce a channel estimate in channel estimation circuitry, said method comprising:
(a) obtaining a training sequence, the training sequence including a plurality of blocks of samples, wherein each block of the plurality of blocks includes a predetermined number of samples;
(b) selecting a first block of the blocks of samples from the training sequence;
(c) transmitting the first block;
(d) modifying the first block such that only one of the samples within the first block is changed;
(e) saving the modified first block into a buffer;
(f) selecting either a new block of the blocks of samples from the training sequence when not all of the training sequence has been transmitted, or a block of the blocks of samples from the buffer that stores modified blocks when that buffer is not empty;
(g) transmitting the selected block;
(h) when the selected block is the new block of the blocks of samples from the training sequence, modifying the selected block such that properties of the sample at a same location as in the modified first block is changed, wherein the changed sample is used to update individual taps of the channel estimate in the channel estimation circuitry independently of other taps by computing a function of (a) a difference between (1) the sample with changed properties from the new block and (2) an other sample from the training sequence, and (b) the channel estimate; and
(i) saving the modified selected block following said modifying (h) when the selected block is the new block.

23. A method as recited in claim 22, wherein said method further comprises:
(j) repeating said selecting (f) through said saving (i) until all the blocks of samples from the training sequence are transmitted.

24. A method for transmitting a training sequence for use in a multicarrier data transmission system to produce a channel estimate in channel estimation circuitry, said method comprising: (a) obtaining a training sequence, the training sequence including a plurality of blocks of samples, wherein each block of the plurality of blocks includes a predetermined number of training samples; (b) selecting a first block of the blocks of samples from the training sequence; (c) transmitting the first block; (d) modifying the first block such that properties of only one of the samples of the samples within the first block is changed; (e transmitting the modified first block; (f selecting a next block of the blocks of samples from the training sequence; (g) transmitting the next block; (h) modifying the next block such that properties of only one of the samples of the samples within the next block is changed, and wherein the changed sample is used to update individual taps of the channel estimate in the channel estimation circuitry independently of other taps by computing a function of (a) a difference between (1) the sample with changed properties from the modified next block and (2) an other sample from the modified first block, and (b) the channel estimate; and (i) transmitting the modified next block.

25. A method as recited in claim 24, wherein the samples are time-domain samples.

26. A method as recited in claim 25, wherein the training sequence is at least pseudo-random.

27. A method as recited in claim 24, wherein said method further comprises:

(j) repeating said selecting (f) through said transmitting (i) until all the blocks of samples from the training sequence are transmitted.

28. A method for transmitting a training sequence for use in a multicarrier data transmission system to produce a channel estimate in channel estimation circuitry, said method comprising: (a) obtaining a group of samples from a training sequence, wherein the group of samples includes a predetermined number of samples, wherein the group of samples being periodic with a period of T, except for one sample different in periodicity, the number of samples in the group being at least 3T, wherein the different sample is used to update individual taps of the channel estimate in channel estimation circuitry independently of other taps by computing a function of (a) a difference between (I) the sample different in periodicity from the group of samples and (2) an other sample from the group of samples, and (b) the channel estimate; and (b) transmitting the group of samples.

29. A method as recited in claim 28, wherein those of the training samples in the group that are periodic have at least a pseudo-random characteristic.

30. A computer readable medium including at least computer program code for transmitting a training sequence for use in a data transmission system to produce a channel estimate, said computer readable medium comprising:
computer program code for obtaining a training sequence, the training sequence including a plurality of blocks of samples, wherein each block of the plurality of blocks includes a predetermined number of samples;
computer program code for selecting a first block of the blocks of samples from the training sequence;
computer program code for transmitting the first block;
computer program code for modifying the first block such that properties of only one of the samples of the samples within the first block is changed, and wherein the sample with changed properties is used to update individual taps of the channel estimate independently of other taps by computing a function of (a) a difference between (1) the sample with changed properties from the first block and (2) an other sample from the training sequence, and (b) the channel estimate;
computer program code for transmitting the modified first block;
computer program code for selecting a second block of the blocks of samples from the training sequence;
computer program code for transmitting the second block;
computer program code for modifying the second block such that properties of the sample at a same location in the second block as the modified one of the samples within the first block is changed; and
computer program code for transmitting the modified second block.

31. A computer readable medium as recited in claim 30, wherein the training sequence is at least pseudo-random.

32. A computer readable medium as recited in claim 31, wherein the samples are time-domain samples.

33. A computer readable medium including at least computer program code for transmitting a training sequence for use in a data transmission system to produce a channel estimate, said method comprising: computer program code for obtaining a group of samples from a training sequence, wherein the group of samples includes a predetermined number of samples, wherein the group of samples being periodic with a period of T, except for one sample different in periodicity, the number of samples in the group being at least 3T, and wherein the different sample is used to update individual taps of the channel estimate independently of other taps by computing a function of (a) a difference between (I) the sample different in periodicity from the group of samples and (2) an other sample from the group of samples, and (b) the channel estimate; and computer program code for transmitting the group of samples.

34. A computer readable medium as recited in claim 33, wherein those of the training samples in the group that are periodic have at least a pseudo-random characteristic.

35. A system as recited in claim 1, wherein the function is a product operation.

36. A system as recited in claim 1, wherein the taps of the channel estimate are updated simultaneously in time and frequency domains.

37. A system as recited in claim 16, wherein the function is a product operation.

38. A system as recited in claim 16, wherein the different sample is in a first group of the training samples and the other sample is in a second group of the training samples.

39. A system as recited in claim 16, wherein the taps of the channel estimate are updated simultaneously in time and frequency domains.

40. A method as recited in claim 22, wherein the function is a product operation.

41. A method as recited in claim 22, wherein the other sample is in the modified first block.

42. A method as recited in claim 22, wherein the taps of the channel estimate are updated simultaneously in time and frequency domains.

43. A method as recited in claim 24, wherein the function is a product operation.

44. A method as recited in claim 24, wherein the taps of the channel estimate are updated simultaneously in time and frequency domains.

45. A method as recited in claim 28, wherein the function is a product operation.

46. A method as recited in claim 28, wherein the different sample is in a first group of samples and the other sample is in a second group of samples.

47. A method as recited in claim 28, wherein the taps of the channel estimate are updated simultaneously in time and frequency domains.

48. A computer readable medium as recited in claim 30, wherein the function is a product operation.

49. A computer readable medium as recited in claim 30, wherein the other sample is in the modified first block samples, and (b) the channel estimate.

50. A computer readable medium as recited in claim 30, wherein the taps of the channel estimate are updated simultaneously in time and frequency domains.

51. A computer readable medium as recited in claim 33, wherein the function is a product operation.

52. A computer readable medium as recited in claim 33, wherein the different sample is in a first group of samples and the other sample is in a second group of samples.

53. A computer readable medium as recited in claim 33, wherein the taps of the channel estimate are updated simultaneously in time and frequency domains.

* * * * *